United States Patent
Seok

(10) Patent No.: US 9,485,716 B2
(45) Date of Patent: Nov. 1, 2016

(54) METHOD AND APPARATUS FOR LOW-POWER SCANNING IN WLAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/401,263

(22) PCT Filed: May 15, 2013

(86) PCT No.: PCT/KR2013/004309
§ 371 (c)(1),
(2) Date: Nov. 14, 2014

(87) PCT Pub. No.: WO2013/172655
PCT Pub. Date: Nov. 21, 2013

(65) Prior Publication Data
US 2015/0139207 A1    May 21, 2015

Related U.S. Application Data

(60) Provisional application No. 61/647,470, filed on May 15, 2012, provisional application No. 61/648,084, filed on May 17, 2012, provisional application No. 61/649,181, filed on May 18, 2012, provisional application No. 61/679,862, filed on Aug. 6, 2012.

(51) Int. Cl.
*H04W 4/00* (2009.01)
*H04W 48/14* (2009.01)

(52) U.S. Cl.
CPC .................... *H04W 48/14* (2013.01)

(58) Field of Classification Search
USPC ........................ 370/329, 330, 331, 333, 338
See application file for complete search history.

(56) References Cited

FOREIGN PATENT DOCUMENTS

| EP | 2158731 A2 | 3/2010 |
|---|---|---|
| EP | 2166799 A1 | 3/2010 |
| EP | 2849499 A1 | 3/2015 |
| KR | 10-2009-0029479 A | 3/2009 |
| WO | 2008147130 A2 | 12/2008 |
| WO | 2009134288 A1 | 11/2009 |
| WO | 2012002757 A2 | 1/2012 |

OTHER PUBLICATIONS

Park, Gi Won et al. "Presentation document for 12-0256 active scanning enhancement" (Year:2012, Den:257, Rev:1) IEEE 802.11 Document. Mar. 12, 2012 <URL=https://mentor.ieee.org/802.11/documents>.

Barber, Phillip et al. "Broadcast Probe Response" (Year:2011, Dcn: 1500. Rev:0) IEEE 802.11 Document. Nov. 6, 2011 <URL=https://mentor.ieee.org/802.11/documents> See slides 2 - 8.

*Primary Examiner* — Zewdu A Beyen
(74) *Attorney, Agent, or Firm* — Dentons US LLP

(57) ABSTRACT

The present invention relates to a wireless communication system, and more specifically, disclosed are a method and an apparatus for low-power scanning in a WLAN system. A method for a station (STA) scanning in the wireless communication system, according to one embodiment of the present invention, comprises the steps of: transmitting a null data packet (NDP) probe request frame; and receiving from an access point (AP) a probe reply frame as a replay to the NDP probe request frame, wherein the NDP probe request frame can include a compressed service set ID (SSID).

13 Claims, 20 Drawing Sheets

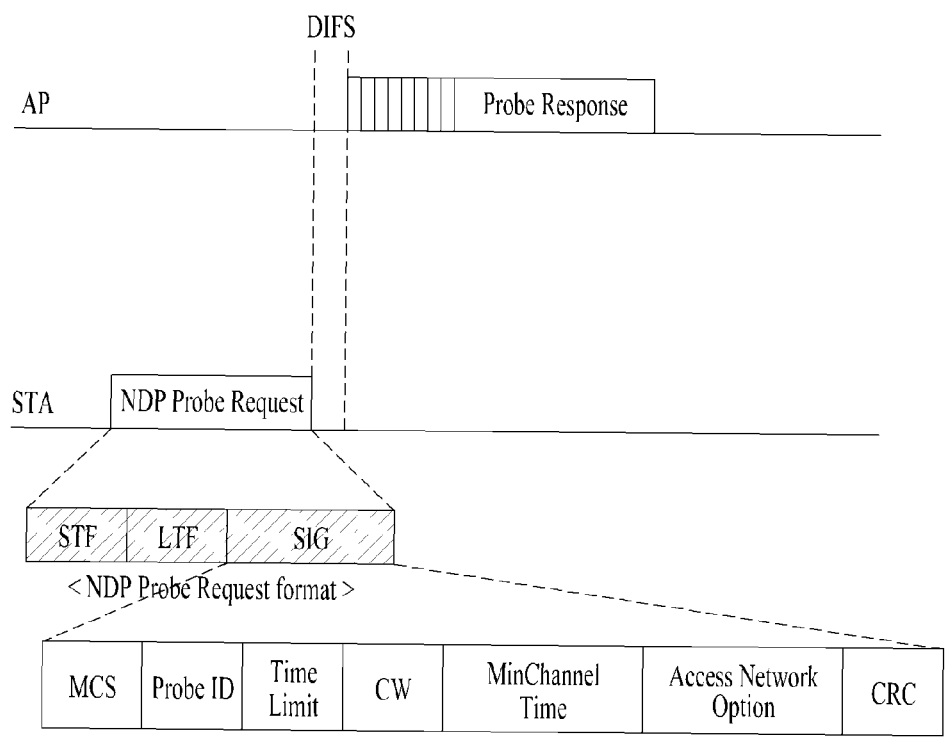

| B0 B3 | B4 | B5 B12 | B13 B20 | B21 B25 | B26 B29 | B30 B35 |
|---|---|---|---|---|---|---|
| MCS | SSID/Interworking Present | Access Network Option | Reserved | Reserved | CRC | Tail |
| | | Compressed SSID | | | | |

(b)

| B0 B3 | B4 | B5 B12 | B13 B36 | B37 | B38 B41 | B42 B47 |
|---|---|---|---|---|---|---|
| MCS | SSID/Interworking Present | Access Network Option | Reserved | Reserved | CRC | Tail |
| | | Compressed SSID | | | | |

METHOD AND APPARATUS FOR LOW-POWER SCANNING IN WLAN SYSTEM

This application is a 35 USC §371 National Stage entry of International Application No. PCT/KR2013/004309 filed on May 15, 2013, and claims priority to US Provisional Application Nos. 61/647,470 filed on May 15, 2012, 61/648,084 filed on May 17, 2012, 61/649,181 filed on May 18, 2012, and 61/679,862 filed on Aug. 6, 2012, all of which are hereby incorporated by reference in their entireties as if fully set forth herein.

TECHNICAL FIELD

The following descriptions relate to a wireless communication system and, more specifically, to a method and apparatus for low-power scanning in a WLAN system.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), laptop computer, portable multimedia player (PMP) or the like on the basis of radio frequency technology.

To overcome the limitations of communication rate, which have been cited as a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize a transmission error and optimize a data rate.

DISCLOSURE

Technical Problem

M2M (Machine-to-Machine) communication technology is under discussion as a next-generation communication technology. IEEE 802.11ah is developed as technical standards for supporting M2M communication in an IEEE 802.11 WLAN system. In M2M, a scenario in which a small amount of data is transmitted at a low rate occasionally in an environment where so many devices are present can be considered.

Communication in a WLAN system is performed through a medium shared by all devices. When the number of devices increases as in M2M communication, a long time is required for channel access of one device. This may deteriorate system performance and hinder power saving of devices.

An object of the present invention devised to solve the problem lies in a method and apparatus for efficiently performing scanning while preventing waste of power.

The technical problems solved by the present invention are not limited to the above technical problems and those skilled in the art may understand other technical problems from the following description.

Technical Solution

The object of the present invention can be achieved by providing a method for performing scanning by a station (STA) in a wireless communication system, including: transmitting a null data packet (NDP) probe request frame; and receiving, from an access point (AP), a probe response frame in response to the NDP probe request frame, wherein the NDP probe request frame includes a compressed service set ID (SSID) field.

In another aspect of the present invention, provided herein is a station (STA) performing scanning in a wireless communication system, including: a transceiver; and a processor, wherein the processor is configured to transmit an NDP probe request frame using the transceiver and to receive, from an AP, a probe response frame in response to the NDP probe request frame using the transceiver, wherein the NDP probe request frame includes a compressed SSID field.

The following is commonly applicable to the aforementioned embodiments of the present invention.

The STA may transmit a normal probe request frame to the AP, send an association request frame to the AP or listen to a beacon frame from the AP upon reception of the probe response frame from the AP.

The probe response frame may be transmitted from the AP when the AP receives the NDP probe request frame and a value of the compressed SSID field included in the NDP probe request frame is identical to a value of a compressed SSID generated on the basis of an SSID of the AP.

The compressed SSID field may be set to a 32-bit cyclic redundancy check (CRC) calculated value when the compressed SSID field is defined as a 32-bit field and set to 16 least significant bits (LSBs) of a 32-bit CRC calculated value of the SSID when the compressed SSID field is defined as a 16-bit field.

The NDP probe request frame may include one of the compressed SSID field and an access network option field, wherein the NDP probe request frame further includes a 1-bit SSID/interworking present field, wherein the SSID/interworking present field indicates which one of the compressed SSID field and the access network option field is included in the NDP probe request frame.

The probe response frame may be transmitted from the AP when the AP receives the NDP probe request frame and a value of the access network option field included in the NDP probe request frame is identical to an access network option of the AP.

The access network option field may have a size of 8 bits and include a 4-bit access network type field, a 1-bit Internet field, a 1-bit additional step required for access (ASRA) field, a 1-bit emergency service reachable (ESR) field and a 1-bit unauthenticated emergency service accessible (UESA) field.

The probe response frame may be a normal probe response frame or a short probe response frame.

The probe response frame may be broadcast.

The AP may transmit the probe response frame through a backoff process after lapse of DIFS (DCF ((Distributed Coordination Function) Inter-Frame Space) upon reception of the NDP probe request frame.

The STA may recognize that the AP is present on a first channel when a frame is detected on the first channel after lapse of SIFS (Short Inter-Frame Space) upon transmission of the NDP probe request frame on the first channel and the STA may move to a second channel and performs scanning when a frame is not detected on the first channel for a predetermined time.

The STA may move to the second channel and performs scanning when a physical layer-CCA indication primitive value indicating a busy state is not detected before expiration of minimum channel time after transmission of the NDP probe request frame on the first channel.

The NDP probe request frame may be a PPDU (PLCP (Physical Layer Convergence Protocol) Packet Data Unit) frame including an STF (Short Training Field), LTF (Long Training Field) and SIG (Signal) field without a data field.

One of the SSID/interworking present field, the compressed SSID field and the access network option field may be included in the SIG field of the NDP probe request frame.

The above description and the following detailed description of the present invention are exemplary and are for additional explanation of the invention disclosed in the claims.

Advantageous Effects

The present invention can provide a method and apparatus for efficiently performing scanning while reducing power consumption by proposing a new scanning mechanism.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 19 illustrates an NDP probing procedure according to another embodiment of the present invention;

FIG. 20 illustrates an exemplary format of an access network option field;

FIGS. 21(a) and 21(b) illustrate examples of a format of an SIG field of an NDP probe request frame according to an embodiment of the present invention;

BEST MODE

Figure 1:
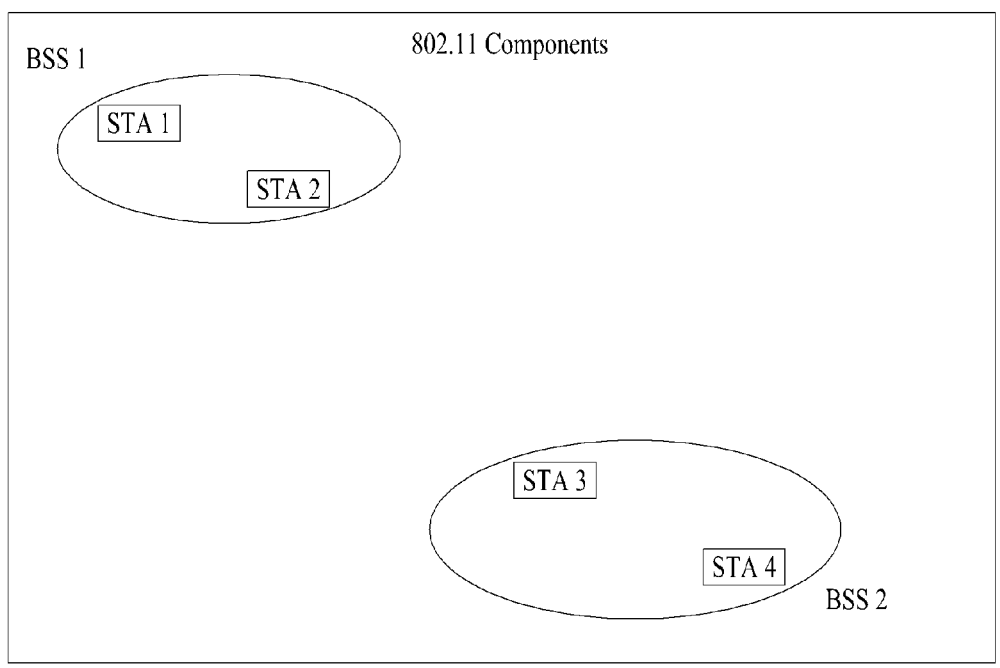
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
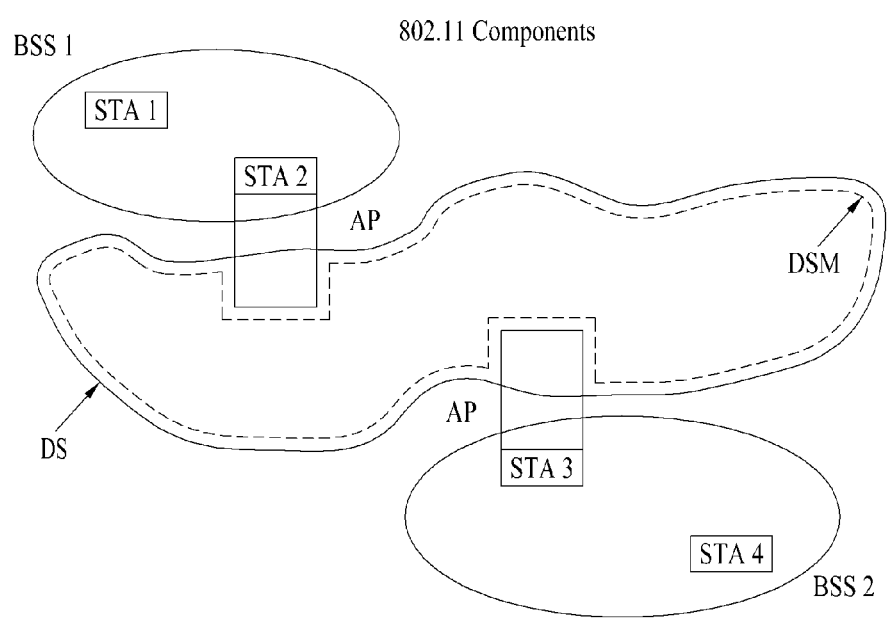
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
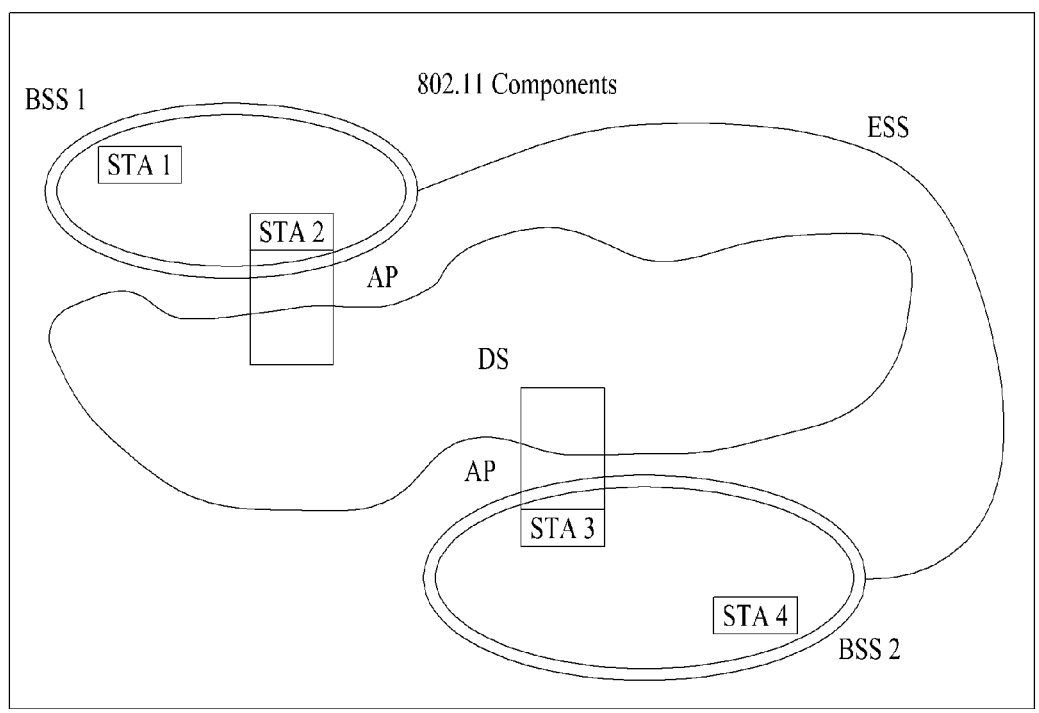
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
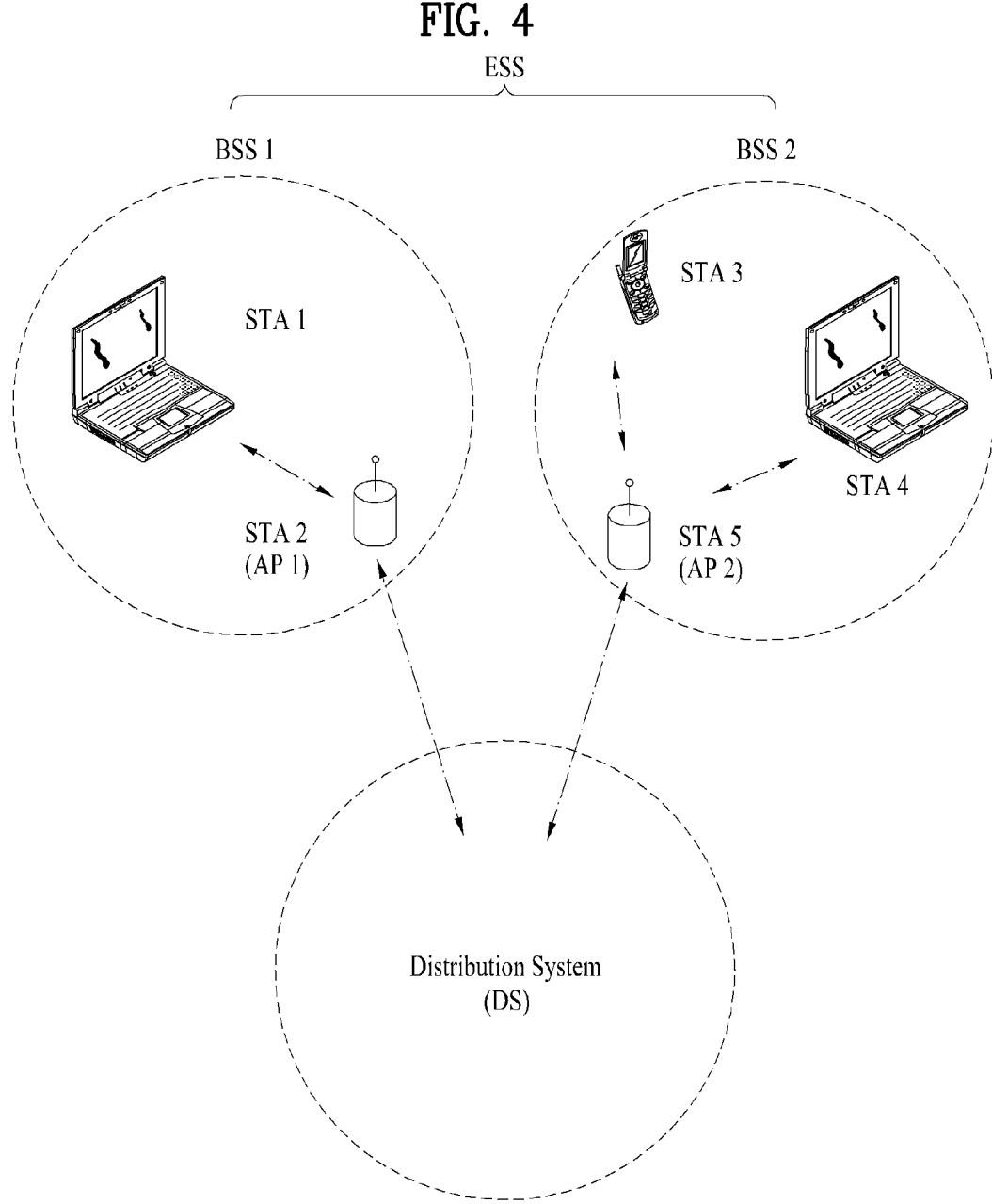
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc. in other wireless communication fields.

Link Setup Procedure

Figure 5:
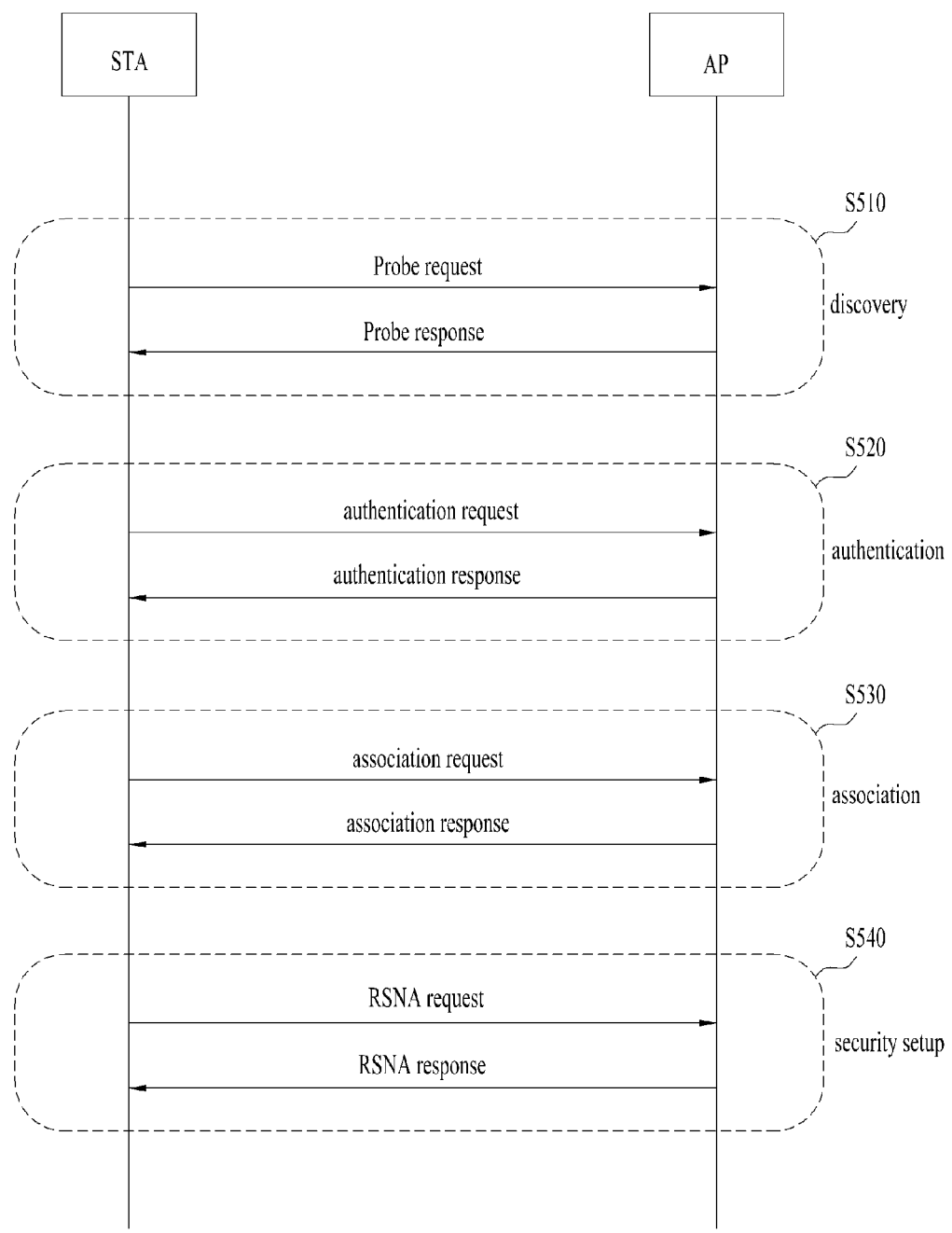
FIG. 5 illustrates a link setup procedure in a WLAN system.

FIG. 5 illustrates a general link setup procedure.

To sets up a link to a network and transmit/receive data, an STA needs to discover the network, perform authentication, establish association and pass through an authentication procedure for security. The link setup procedure may be called a session initiation procedure and a session setup procedure. In addition, discovery, authentication, association and security establishment of the link setup procedure may be called an association procedure.

An exemplary link setup procedure will now be described with reference to FIG. 5.

The STA may discover a network in step S510. Network discovery may include a scanning operation of the STA. That is, the STA needs to discover a network that can participate in communication in order to access the network. The STA needs to identify a compatible network prior to participating in a wireless network. A procedure of identifying a network present in a specific area is referred to as scanning.

Scanning includes active scanning and passive scanning.

FIG. 5 illustrates network discovery operation including active scanning. The STA performing active scanning transmits a probe request frame in order to search surrounding APs while changing channels and waits for a response to the probe request frame. A responder transmits a probe response frame in response to the probe request frame to the STA. Here, the responder may be an STA that has finally transmitted a beacon frame in a BSS of a channel being scanned. An AP corresponds to a responder in a BSS since the AP transmits a beacon frame, whereas a responder is not fixed in an IBSS since STAs in the IBSS transmit a beacon frame in rotation. For example, an STA, which has transmitted a probe request frame on channel #1 and has received a probe response frame on channel #1, may store BSS related information included in the received probe response frame, move to the next channel (e.g. channel #2) and perform scanning (i.e. probe request/response transmission and reception on channel #2) in the same manner.

The scanning operation may be performed in a passive manner, which is not shown in FIG. 5. An STA performing passive scanning waits for a beacon frame while changing channels. The beacon frame, one of management frames in IEEE 802.11, indicates presence of a wireless network and is periodically transmitted to the STA performing scanning to enable the STA to discover and participate in the wireless network. An AP periodically transmits the beacon frame in the BSS, whereas STAs in the IBSS transmit the beacon frame in rotation in the case of IBSS. Upon reception of the beacon frame, the STA performing scanning stores information about the BSS, included in the beacon frame, and records beacon frame information in each channel while moving to another channel. The STA that has received the beacon frame may store BSS related information included in the received beacon frame, move to the next channel and perform scanning on the next channel through the same method.

Comparing active scanning with passive scanning, active scanning has advantages of smaller delay and lower power consumption than passive scanning.

Upon discovery of the network, authentication may be performed on the STA in step S520. This authentication procedure may be referred to as first authentication to be discriminated from security setup operation of step S540, which will be described later.

Authentication includes a procedure through which the STA transmits an authentication request frame to the AP and a procedure through which the AP transmits an authentication response frame to the STA in response to the authentication request frame. An authentication frame used for authentication request/response corresponds to a management frame.

The authentication frame may include information about an authentication algorithm number, authentication transaction sequence number, status code, challenge text, RSN (Robust Security Network), finite cyclic group, etc. This information is part of information that may be included in the association request/response frame and may be replaced by other information or may further include additional information.

The STA may transmit the authentication request frame to the AP. The AP may determine to permit authentication of the STA on the basis of information included in the received authentication request frame. The AP may provide an authentication result to the STA through the authentication response frame.

Upon successful authentication of the STA, association may be performed in step S530. Association includes a procedure through which the STA transmits an association request frame to the AP and a procedure through which the AP transmits an association response frame to the STA in response to the association request frame.

For example, the association request frame may include information related to various capabilities, a beacon listen interval, a service set identifier (SSID), supported rates, supported channels, RSN, mobility domain, supported operating classes, TIM (Traffic Indication Map) broadcast request, interworking service capability, etc.

For example, the association response frame may include information related to various capabilities, a status code, AID (Association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, etc.

The aforementioned information is part of information that may be included in the association request/response frame and additional information may be further included in the association request/response frame.

Upon successful association of the STA with the network, security setup may be performed in step S540. Security setup in step S540 may be regarded as authentication through an RSNA (Robust Security Network Association) request/response. Authentication of step S520 may be referred to as first authentication and security setup of step S540 may be referred to as authentication.

Security setup of step S540 may include private key setup through 4-way handshaking using an EAPOL (Extensible Authentication Protocol over LAN) frame. In addition, security setup may be performed according to a security scheme that is not defined in IEEE 802.11.

Evolution of WLAN

To overcome limited communication speed of a WLAN, IEEE 802.11n has been recently established as a technical standard. IEEE 802.11n has been developed to increase a network speed and reliability and extend a wireless network coverage. More specifically, IEEE 802.11n supports high throughput (HT) of higher than 540 Mbps and is based on MIMO using multiple antennas both for a transmitter and a receiver in order to minimize transmission error and optimize a transmission speed.

As supply of WLAN is activated and applications using WLAN are diversified, a new WLAN system for supporting higher throughput than the data throughput supported by IEEE 802.11n is required. A next-generation WLAN system supporting very high throughput (VHT) is a version (e.g. IEEE 802.11ac) following IEEE 802.11n and is one of IEEE 802.11 WLAN systems recently newly proposed in order to support data throughput of higher than 1 Gbps in a MAC service access point (SAP).

Next-generation WLAN systems support MU-MIMO (Multi-User Multiple Input Multiple Output) transmission in which a plurality of STAs simultaneously accesses channels in order to efficiently use radio channels. According to MU-MIMO, an AP can simultaneously transmit packets to one or more MIMO-paired STAs.

In addition, supporting WLAN system operations in a whitespace is under discussion. For example, introduction of a WLAN system in a TV whitespace (TV WS) such as a frequency band in an idle state (e.g. 54 to 698 MHz) according to digitalization of analog TV is discussed in IEEE 802.11af. However, this is exemplary and the whitespace can be regarded as a licensed band that can be preferentially used by a licensed user. The licensed user refers to a user permitted to use a licensed band and may be called a licensed device, a primary user, an incumbent user and the like.

For example, an AP and/or an STA operating in the WS need to provide protection for a licensed user. When a licensed user such as a microphone is using a specific WS channel corresponding to a frequency band having a specific bandwidth according to regulation, the AP and/or the STA cannot use the frequency band corresponding to the WS channel in order to protect the licensed user. In addition, when the licensed user uses a frequency band used to transmit and/or receive a current frame, the AP and/or the STA need to stop using the corresponding frequency band.

Accordingly, the AP and/or the STA need to preferentially perform a procedure of checking whether a specific frequency band in the WS can be used, in other words, whether there is a licensed user using the frequency band. To check whether a licensed user is present for a specific frequency band is called spectrum sensing. Energy detection, signature detection or the like are used as a spectrum sensing mechanism. When the strength of a received signal exceeds a predetermined value or a DTV preamble is detected, it can be determined that a licensed user is using a corresponding frequency band.

Furthermore, M2M (Machine-to-Machine) is discussed as a next-generation communication scheme. In IEEE 802.11 WLAN systems, IEEE 802.11ah is developed in order to support M2M. M2M refers to a communication scheme using one or more machines and may be called MTC (Machine Type Communication) or machine communication. Here, a machine refers to an entity that does not require direct manipulation or intervention of a person. For example, examples of the machine include a device such as a meter or a vending machine equipped with a radio communication module and a user equipment such as a smartphone capable of automatically accessing a network to perform communication without manipulation/intervention of a user. M2M may include communication between devices (device-to-device (D2D)) and communication between a device and an application server. Examples of communication between a device and an application server may include communication between a vending machine and a server, communication between a POS (Point of Sale) device and a server and communication between an electricity, gas or water meter and a server. In addition, M2M communication based applications may include security, transportation, healthcare and the like. Considering characteristics of these applications, M2M needs to support transmission and reception of a small amount of data at a low speed occasionally in an environment in which a large number of devices is present.

Specifically, M2M communication needs to support a large number of STAs. While it is assumed that a maximum of 2007 STAs is associated with one AP in a currently defined WLAN system, methods for supporting a case in which a larger number of (about 6000) STAs is associated with one AP are under discussion for M2M. Furthermore, it is expected that there are many applications supporting/requiring a low transmission rate in M2M communication. In a WLAN system, an STA can recognize presence of data to be transmitted thereto on the basis of a TIM (Traffic Indication Map) element. Methods for reducing a bitmap size of a TIM are discussed in order to support the aforementioned applications. In addition, it is expected that a large amount of traffic having a very long transmission/reception interval is present in M2M communication. For example, a very small amount of data such as electricity/gas/water consumption can be transmitted and received at a long interval (e.g. per month). Furthermore, since an operation of an STA is performed according to a command provided through downlink (i.e. link from an AP to a non-AP STA) and result data is reported through uplink (i.e. link from the non-AP STA to the AP) in M2M communication, M2M communication uses improved communication schemes on uplink through which principal data is transmitted. In addition, most M2M STAs operate using a battery and thus it is necessary to ensure a long use time by minimizing battery consumption. Furthermore, M2M STAs need to have a self-recovery function since it may be difficult for users to directly manipulate the M2M STAs in a specific situation. Accordingly, methods for efficiently supporting a case in which the number of STAs having data frames to receive an AP during one beacon period is very small even though the number of STAs associated with the AP is very large and reducing power consumption are under discussion in WLAN systems.

As described above, WLAN technology is rapidly evolving and thus technologies for direct link set-up, improving media streaming performance, supporting fast and/or large-scale initial session set-up, an extended bandwidth and operating frequency, etc. are being developed in addition to the aforementioned examples.

WLAN Operating at Sub-1 GHz

As described above, IEEE 802.11ah having M2M communication as a use case is under discussion. IEEE 802.11ah operates in unlicensed bands other than the TV whitespace band at an operating frequency of sub-1 GHz and may have a remarkably wider coverage (e.g. a maximum of 1 km) than a conventional WLAN supporting indoor coverage. That is, when a WLAN is used in a sub-1 GHz (e.g. 700 to 900 MHz) operating frequency band, distinguished from a conventional WLAN operating at a frequency of 2.4 GHz or 5 GHz, AP coverage is approximately doubled or tripled for the same transmission power due to propagation characteristics of the corresponding frequency band. In this case, a remarkably large number of STAs can be connected per AP. Use cases considered in IEEE 802.11ah are summarized as shown in Table 1.

TABLE 1

Use Case 1: Sensors and meters

1a: Smart Grid - Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and meter data Backhaul aggregation of sensors
Backhaul aggregation of industrial sensors
Use Case 3: Extended range Wi-Fi Outdoor extended range hotspot
Outdoor Wi-Fi for cellular traffic offloading According to use case 1 shown in Table 1, sensors/meters of various types can be connected to an 802.11ah AP to perform M2M communication. Particularly, in the case of a smart grid, a maximum of 6000 sensors/meters can be connected to one AP.

According to use case 2 shown in Table 1, an 802.11ah AP providing a wide coverage functions as a backhaul link of another system such as IEEE 802.15.4g.

According to use case 3 shown in Table 1, an extended home coverage, campus wide coverage and communication in an outdoor extended range hotspot such as shopping malls can be supported. In addition, the 802.11ah AP can distribute overload of cellular traffic by supporting traffic offloading of cellular mobile communication.

A physical layer (PHY) for communication in a sub-1 GHz band can be implemented through 1/10 down-clocking of IEEE 802.11ac PHY. In this case, 2/4/8/16/8+8 MHz channel bandwidths in a sub-1 GHz band can be provided through 1/10 down-clocking of 20/40/80/160/80+80 MHz channel bandwidths in 802.11ac. Accordingly, a guard interval (GI) increases 10 times from 0.8 μs to 8 μs. The following table 2 compares throughputs of 802.11ac PHY and 1/10 down-clocked sub-1 GHz PHY.

TABLE 2

| IEEE 802.11ac PHY Channel Bandwidth/Throughput | 1/10 down-clocked sub-1 GHz PHY Channel Bandwidth/Throughput |
| --- | --- |
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
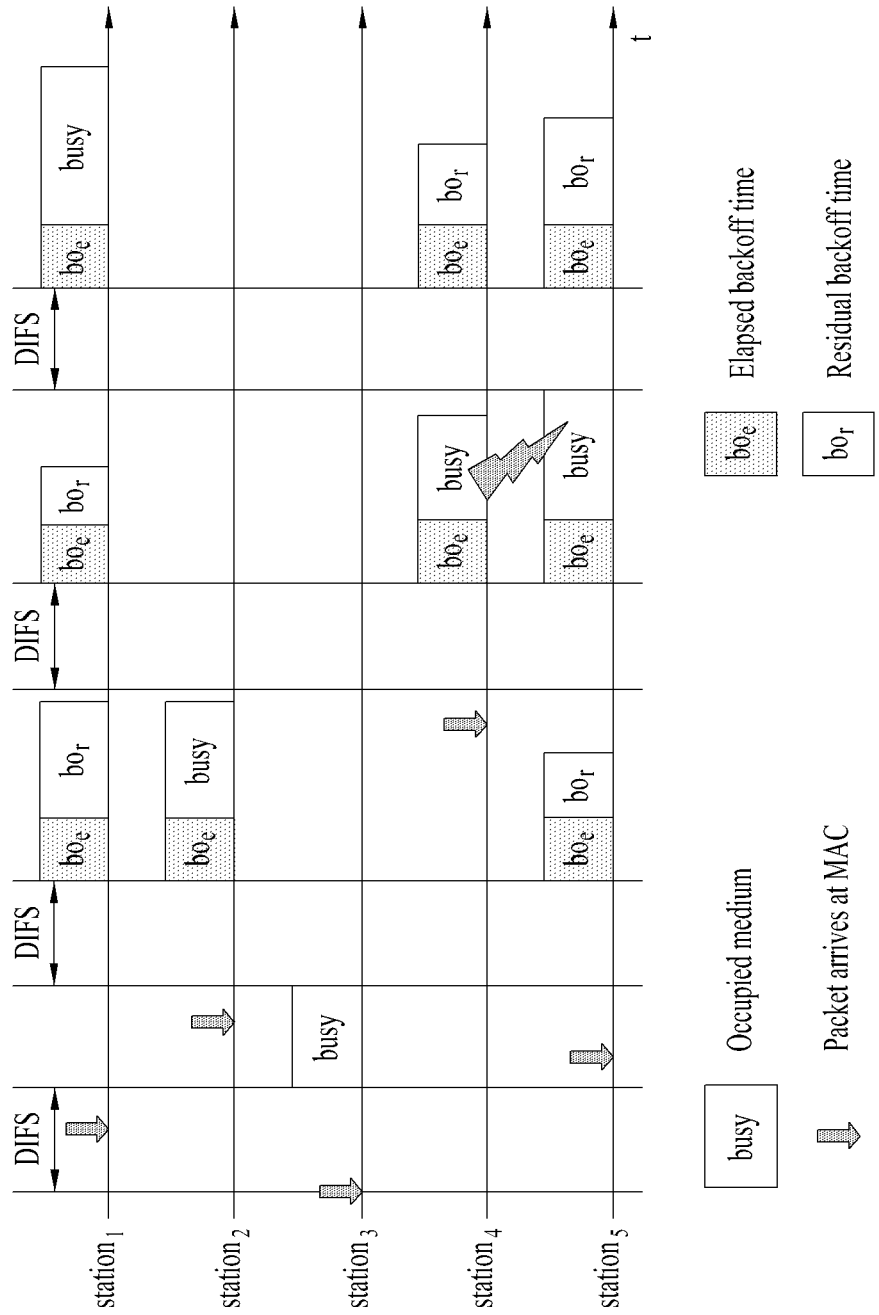
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frames). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of transmission failure (for example, in the case in which ACK of the transmission frame is not received). If the CW parameter value is denoted by CWmax, CWmax is maintained until data transmission is successful, and at the same time it is possible to attempt to start data transmission. If data transmission is successful, the CW parameter value is reset to CWmin. Preferably, CW, CWmin, and CWmax are set to 2n−1 (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at STA3, STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, unexpected collision may occur between STA4 and STA5. If collision occurs between STA4 and STA5, neither STA4 nor STA5 receives ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA of the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a "duration" field of the MAC header of the frame.

The robust collision detection mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
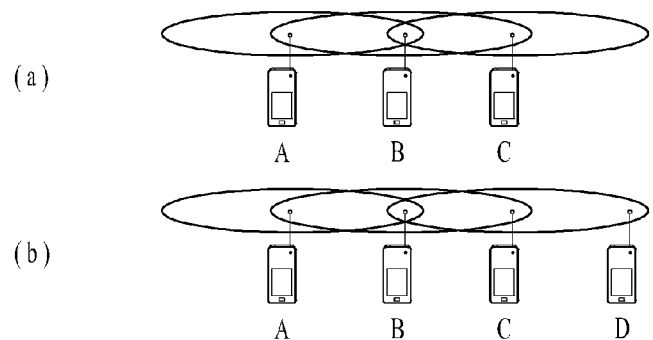
FIGS. 7(a) and 7(b) are conceptual diagrams illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
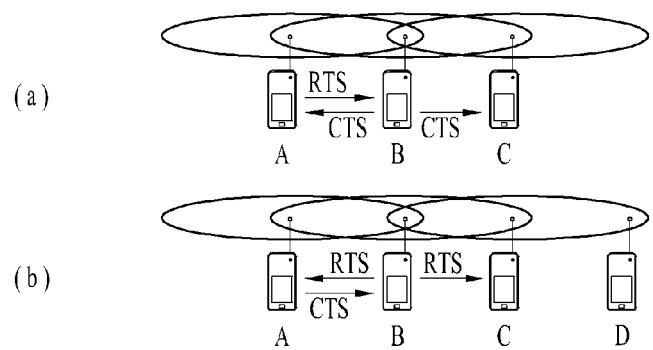
FIGS. 8(a) and 8(b) are conceptual diagrams illustrating a hidden node and an exposed node.

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that presence of the frame to be transmitted to the STA is decided).

Figure 9:
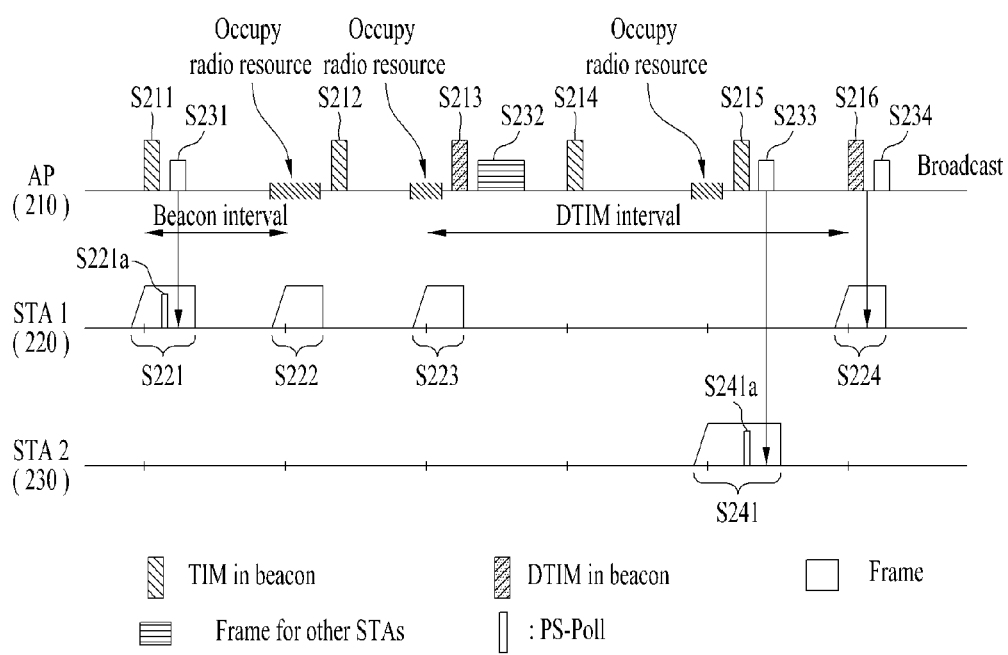
FIG. 9 is a conceptual diagram illustrating a power management (PM) operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state (S221) when AP 210 first transmits the beacon frame (S211). STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 (S221a). The AP 210 may transmit the frame to STA 1 220 in response to the PS-Poll frame (S231). STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, it does not receive the delay-transmitted beacon frame so that it re-enters the sleep state (S222).

When AP 210 thirdly transmits the beacon frame, the corresponding beacon frame may include a TIM element denoted by DTIM. However, since the busy medium state is given, AP 210 transmits the beacon frame at a delayed time (S213). STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received by the STA1 220, and re-enters the sleep state, such that the STA1 220 may operate in the sleep state. After the AP 210 transmits the beacon frame, the AP 210 transmits the frame to the corresponding STA (S232).

AP 210 fourthly transmits the beacon frame (S214). However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame (S214) and transmits a fifth beacon frame (S215), STA1 220 maintains the sleep state such that it cannot obtain the corresponding TIM element.

When AP 210 sixthly transmits the beacon frame (S216), STA1 220 is switched to the awake state and operates in the awake state, such that the STA1 220 is unable to obtain the TIM element contained in the beacon frame (S224). The TIM element is a DTIM indicating the presence of a broadcast frame, such that STA1 220 does not transmit the PS-Poll frame to the AP 210 and may receive a broadcast frame transmitted by the AP 210 (S234). In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element (S241). STA2 230 recognizes the presence of a frame to be transmitted to the STA2 230 through the TIM element, and transmits the PS-Poll frame to the AP 210 so as to request frame transmission (S241a). AP 210 may transmit the frame to STA2 230 in response to the PS-Poll frame (S233).

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
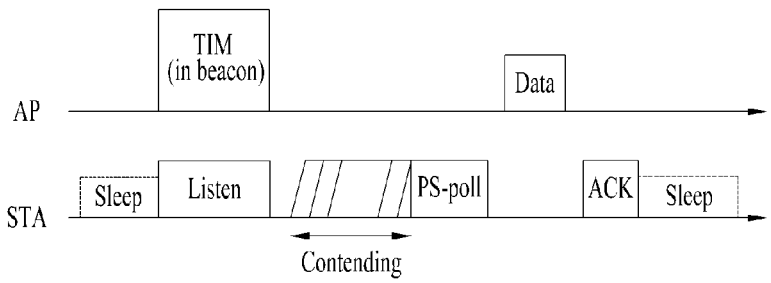
FIGS. 10 to 12 are conceptual diagrams illustrating detailed operations of an STA having received a Traffic Indication Map (TIM)
Figure 11:
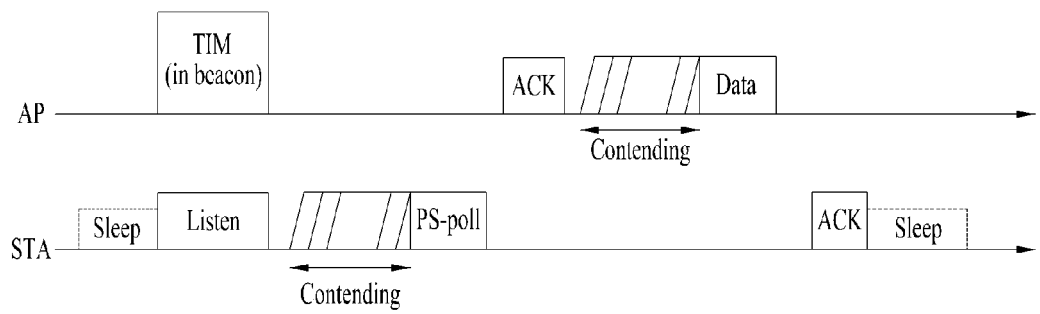
Figure 12:
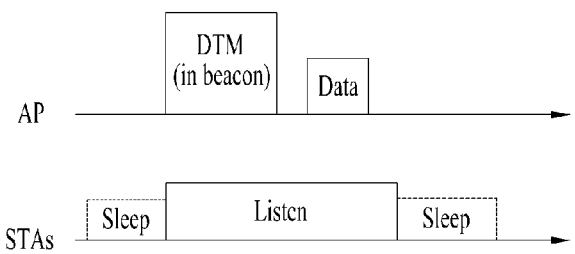

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be given with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of contention. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the power save (PS) mode based on the TIM (or DTIM) protocol shown in FIGS. 9 to 12, STAs may determine the presence or absence of a data frame to be transmitted thereto through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for M2M application through which many STAs (for example, at least 2007 STAs) are associated with one AP. If the conventional TIM structure is extended without change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive 0s are omitted from a head part of a bitmap, and the omitted result may be defined as an offset (or start point) value. However, although STAs each including the buffered frame are small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP are small in number, inefficiency of bitmap compression does not cause serious problems. However, if the number of STAs associated with one AP increases, such inefficiency may deteriorate overall system throughput.

Figure 13:
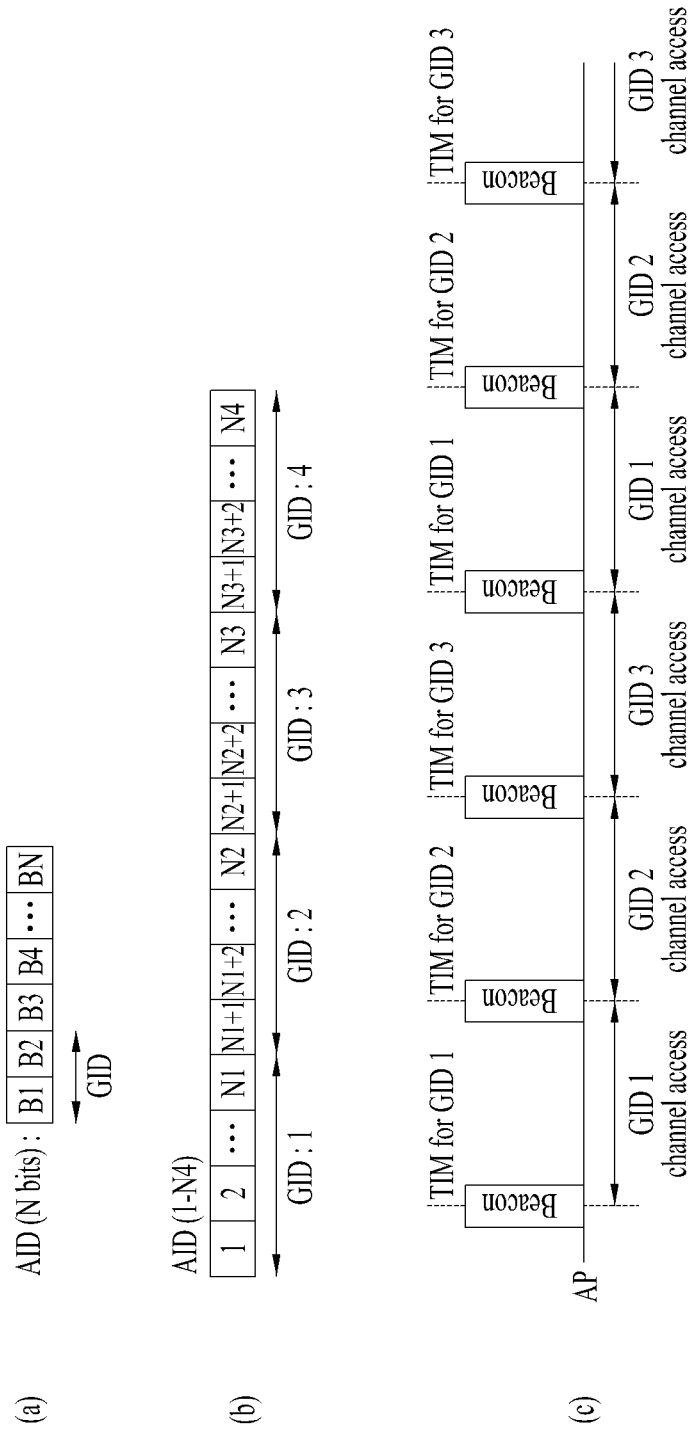
FIGS. 13(a), 13(b) and 13(c) illustrate group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each beacon interval subsequent to the fifth beacon interval (or in each of RAWs subsequent to the fifth RAW).

Although FIG. 13(c) exemplarily shows that the order of allowed GIDs is periodic or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

U-APSD Mechanism

According to an Unscheduled-Automatic Power Save Delivery (U-APSD) mechanism, an STA can notify an AP of a requested transmission duration in order to use a U-APSD service period (SP) and the AP can transmit frames to the STA during the SP. According to the U-APSD mechanism, the STA can simultaneously receive multiple PSDUs from the AP using the SP thereof.

The STA can recognize presence of data to be transmitted thereto from the AP through a TIM element of a beacon. Then, the STA can request the AP to transmit the data while notifying the AP that the SP of the STA has started by transmitting a trigger frame to the AP at a desired time. The AP can transmit ACK as a response to the trigger frame. Subsequently, the AP can transmit RTS to the STA through contention, receive a CTS frame from the STA and then send the data to the STA. Here, the data transmitted by the AP can be composed of one or more data frames. When the AP transmits the last data frame, if the AP sets EOSP (End of Service Period) to 1 in the corresponding data frame and transmits the data frame to the STA, then the STA can recognize the EOSP and finish the SP. Accordingly, the STA can transmit ACK indicating successful data reception to the AP. According to the U-APSD mechanism, the STA can start the SP thereof at a desired timing so as to receive data and receive multiple data frames in one SP, thereby achieving efficient data reception.

PPDD Frame Format

Figure 14:
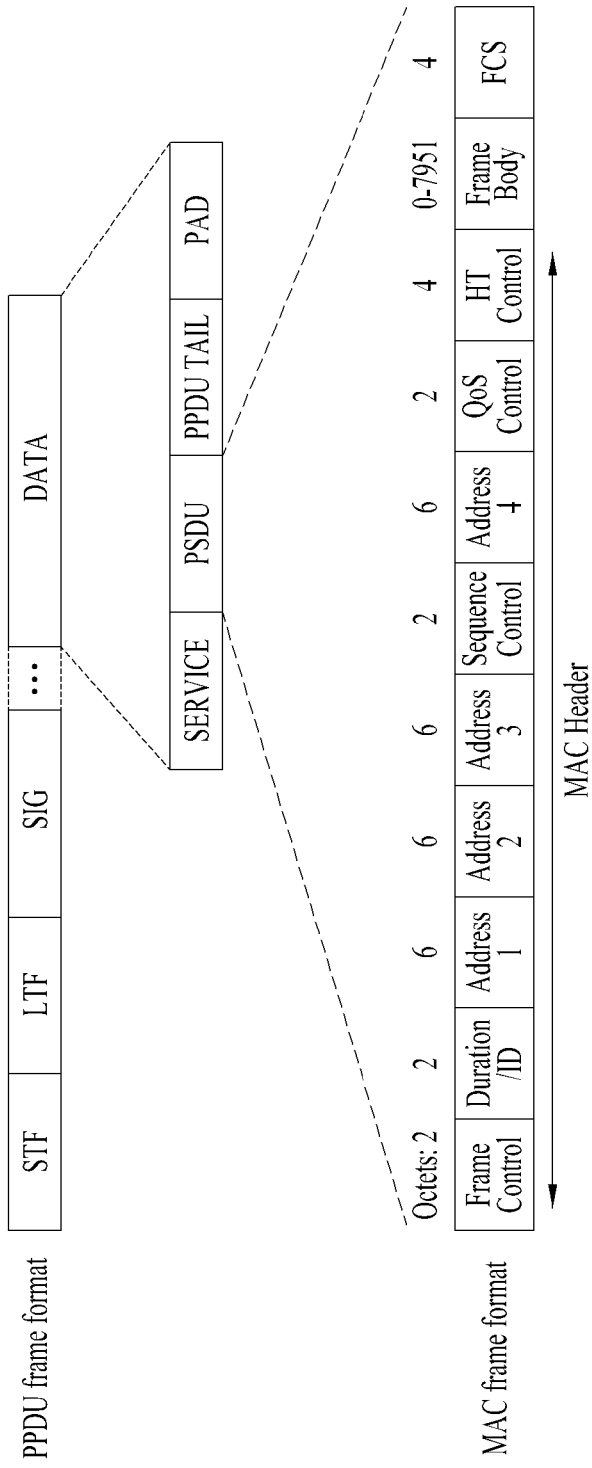
FIG. 14 illustrates a conventional frame structure used in IEEE 802.11.

FIG. 14 is a diagram for explaining a conventional frame format used in IEEE 802.11.

Referring to FIG. 14, a Physical Layer Convergence Protocol (PLCP) Packet Data Unit (PPDU) frame format may include a Short Training Field (STF), a Long Training Field (LTF), a signal (SIG) field, and a data field. The data field may include a SERVICE field, a PLCP Service Data Unit (PSDU) and a PPDU TAIL bit and may further include a padding bit as necessary.

The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG field) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. Four address fields (Address 1, Address 2, Address 3, Address 4) may indicate a Basic Service Set Identifier (BSSID), a Source Address (SA), a Destination Address (DA), a Transmitter Address (TA), a Receiver Address (RA), etc. Only some parts from among four address fields may be included according to frame type. For example, an 'Address 1' field may be set to a specific value corresponding to a receiver address (RA) of a receiver configured to receive the corresponding MAC frame, and an 'Address 2' field may be set to a specific value corresponding to a transmitter address (TA) of a transmitter configured to transmit the corresponding MAC frame. The value of each address field may be set to an Ethernet MAC address composed of 48 bits.

The MAC frame format shown in FIG. 14 is a general format and Address 2, Address 3, Sequence Control, Address 4, QoS Control, HT Control and Frame Body field may be present in a specific frame type and sub-type only.

A null-data packet (NDP) frame format may indicate a frame format having no data packet. That is, the NDP frame includes a PLCP header part (i.e., STF, LTF, and SIG field) of a general PPDU format, whereas it does not include the remaining parts (i.e., the data field). The NDP frame may be referred to as a short frame format.

Low Power Scanning Using NDP

As described above with reference to FIG. 5, an STA can perform active scanning or passive scanning in order to discover a network (or AP).

Active scanning is performed in such a manner that, when the STA broadcasts a probe request frame on a specific channel, the AP replies to the probe request frame using a probe response frame upon reception of the probe request frame. The probe request frame includes an SSID field. SSID corresponds to the ID or name of the network (or AP). A value of the SSID field included in the frame request frame may be set to a value indicating a network (or AP) that the STA desires to discover or to receive a response. Accordingly, only an AP having the SSID corresponding to the SSID included in the probe request frame can reply using the probe response frame. The probe response frame may be unicast to the STA.

Passive scanning refers to a procedure through which the STA discovers a network (or AP) by receiving a beacon frame transmitted on a specific channel rather than transmitting the probe request frame.

To reduce power consumption of the STA during scanning, the frequency of scanning, a time required for one scanning process or the size of a frame (or signaling overhead) used for scanning may be decreased.

Power consumed for scanning may depend on network environment. For example, in an environment in which the AP is present all the time or the AP is installed by a manager, the STA need not discover a new AP or only discovers a specific AP on a specific known channel. Accordingly, power consumption of the STA can be remarkably reduced during scanning. In an environment in which no AP is present, however, power consumption of the STA may considerably increase since the STA continuously performs scanning until an AP is discovered.

Since power consumption of the STA, required for scanning, considerably depends on presence of absence of the AP, as described above, an unnecessary scanning process can be skipped and thus unnecessary power consumption of the STA can be remarkably reduced if the STA can check only whether the AP is present through a simple procedure. For example, scanning is not performed in an environment where the AP is not present since a network cannot be discovered even if scanning is performed and scanning is carried out only in an environment where the AP is present, thereby enabling efficient scanning. To this end, the present invention provides a new mechanism through which the STA can easily check only whether the AP is present. In addition, the present invention provides a mechanism for reducing power consumption of the STA by designing a procedure of checking presence or absence of the AP such that the procedure has minimum overhead.

The present invention presents a procedure of using an NDP frame (referred to as an NDP probing procedure or NDP probing hereinafter) to check presence or absence of the AP. A description will be given of detailed embodiments of the NDP probing procedure according to the present invention.

In the NDP probing procedure, an STA may transmit a probe request frame in the form of an NDP and an AP may replay using a probe response frame (or NDP probe response frame) after a lapse of SIFS upon reception of the NDP probe request frame. The NDP probe response frame may be referred as a short probe response frame since the NDP probe response frame has a shorter length than a normal probe response frame.

Figure 15:
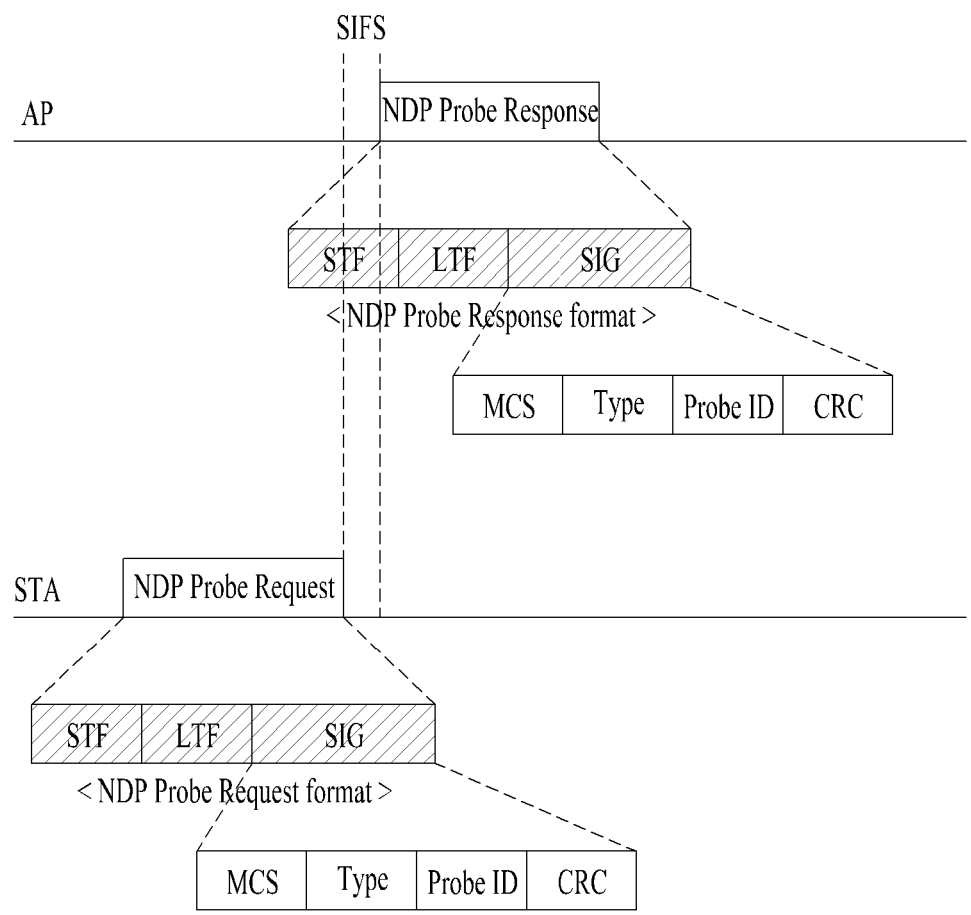
FIG. 15 illustrates an NDP probing procedure according to an embodiment of the present invention.

FIG. 15 illustrates an NDP probing procedure according to an embodiment of the present invention.

In the example of FIG. 15, an STA transmits an NDP probe request frame and an AP replies using an NDP probe response frame after a lapse of SIFS upon reception of the NDP probe request frame.

As shown in FIG. 15, the NDP probe request frame may be configured as an NDP frame including an STF, LTF and SIG field. The NDP probe response frame may also be configured as an NDP frame including an STF, LTF and SIG field.

Referring to FIG. 15, sub-fields of the SIG field of the NDP probe request frame may include a Modulation and Coding Scheme (MCS) field, Type field, Probe ID field and Cyclic Redundancy Check (CRC) field. The configuration of the sub-fields of the SIG field of the NDP probe request frame is exemplary and an additional field may be defined or the sub-fields may be composed of some of the exemplary fields.

The MCS field may be used to discriminate between a normal PPDU, NDP probe request and NDP probe response. For example, when an MCS value of a frame is one of 0 to 10, the MCS value indicates that the frame is a normal PPDU. When the MCS value is one of 11 to 15, the MCS value indicates that the frame is an NDP probe request or NDP probe response frame.

Type field may be used to discriminate the NDP probe request from the NDP probe response. For example, a value of Type field of a frame indicates that the frame is an NDP probe request frame when the value is 0 and indicates that the frame is an NDP probe response frame when the value is 1.

The probe ID field may be used to designate the ID of the AP. That is, the probe ID field has a function similar to that of the SSID in the normal probe request frame. However, the probe ID field may include part of an SSID or a compressed form of the SSID rather than a full SSID. When the probe ID field has a value of 0, the probe ID field indicates a wildcard SSID and all APs that have received an NDP probe request frame can reply (that is, transmit NDP probe response frames.). When the probe ID field has a value other than 0, only an AP having the same probe ID value as that included in the NDP probe request frame can reply (that is, transmit an NDP probe response frame). Setting of the probe ID field to part of an SSID (or a compressed SSID) means that one or more APs may be matched to part of the SSID when a full SSID is matched to only one AP. In this case, one or more APs matched to the probe ID value can reply to the NDP probe request frame.

As shown in FIG. 15, the SIG field of the NDP probe response frame may include MCS field, Type field, Probe ID field and CRC field.

Modulation and Coding Scheme (MCS) field, Type field, Probe ID field and Cyclic Redundancy Check (CRC) field can be included in the SIG field. The configuration of sub-fields of the SIG field of the probe response frame is exemplary and additional fields may be defined or the sub-fields may be composed of some of the aforementioned exemplary fields.

Definition of the MCS field, Type field and Probe ID field in the SIG field of the probe response frame may be the same as the MCS field, Type field and Probe ID field in the SIG field of the probe request frame. For example, MCS field can have a value in the range of 11 to 15, Type field can have a value of 0 and Probe ID field can have a specific compressed SSID in the NDP probe request frame. In the NDP probe response frame, MCS field can have a value in the range of 11 to 15, Type field can have a value of 1 and Probe ID field can have the same value as the probe ID included in the NDP probe request frame.

As described above, the STA can recognize presence or absence of the AP through the NDP probing procedure. Accordingly, the STA can associate with the corresponding AP only when the AP is present, perform a normal probe request/response process (i.e. active scanning) or receive a beacon from the corresponding AP (i.e. passive scanning). When the STA recognizes absence of the AP through the NDP probe request/response process, the STA does not perform active scanning so as to reduce unnecessary power consumption.

Figure 16:
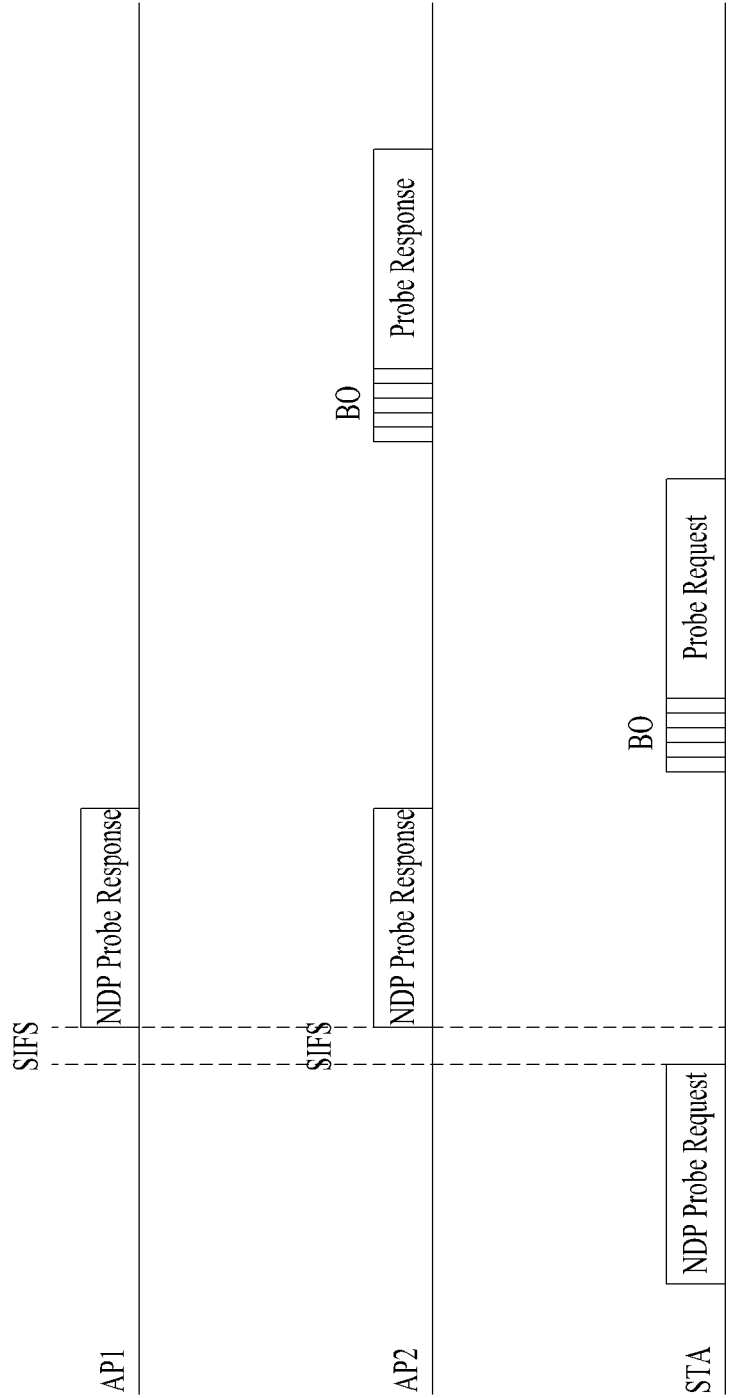
FIG. 16 illustrates an NDP probing procedure in an environment in which a plurality of APs is present.

FIG. 16 illustrates an NDP probing procedure in an environment in which a plurality of APs is present.

The environment in which a plurality of APs is present may be an overlapping BSS (OBSS) environment in which a plurality of BSSs operates on the same channel and some or all BSAs of the BSSs overlap.

Referring to FIG. 16, when an STA transmits an NDP probe request frame and AP1 and AP2 simultaneously transmit NDP probe response frames after lapse of SIFS, that is, when multiple APs are matched to a probe ID field value (e.g. part of an SSID or a compressed SSID) of the NDP probe request frame transmitted by the STA, AP1 and AP2 can respectively reply to the NDP probe request frame using the NDP probe response frames. When the NDP probe response frame is configured according to definition of the NDP probe response frame described with reference to FIG. 15, the NDP probe response frames respectively transmitted by AP1 and AP2 can be identical to each other.

The STA may detect the NDP probe response frame transmitted by at least one of AP1 and AP2. Even when the STA can receive both the NDP probe response frames from AP1 and AP2, this operation corresponds to repeated reception of the same frame from the viewpoint of the STA. Accordingly, the operation of the STA to receive one NDP probe response frame and the operation of the STA to receive multiple NDP probe response frames can be defined as the same operation. The STA can detect the NDP probe response frame by decoding only STF and LTF sequences of the NDP probe response frame or by decoding STF, LTF and SIG field.

When the STA transmits the NDP probe request frame and detects at least one NDP probe response frame as a response to the NDP probe request frame, the STA recognizes that at least one AP is present on the corresponding channel. In this case, the STA can perform active scanning by transmitting a normal probe request frame instead of the NDP probe request frame. The normal probe request frame may be transmitted through a predetermined backoff (BO) process. Upon reception of the normal probe request frame from the STA, an AP (e.g. AP2) can transmit a normal probe response frame to the STA through a backoff process.

Figure 17:
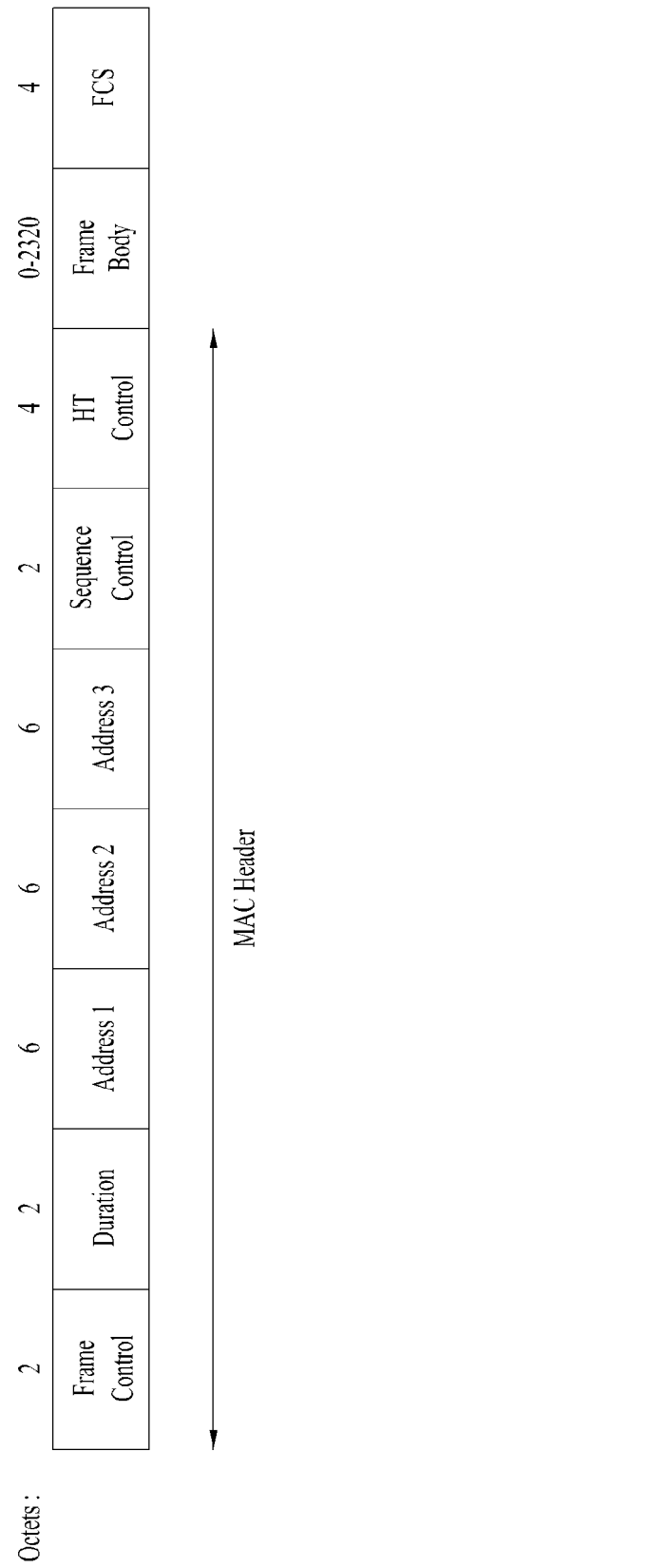
FIG. 17 illustrates an exemplary MAC management frame.

The normal probe request frame and the normal probe response frame may be configured in the form of a MAC management frame and transmitted. That is, the normal probe request frame and the normal probe response frame may be configured as a PPDU frame including STF, LTF, SIG field and data field and PSDU included in the data field of the PPDU frame, that is, the format of MAC PDU may be configured in the form of a MAC management frame. FIG. 17 illustrates an exemplary MAC management frame. The MAC management frame can be defined in a format in which the Sequence Control field, Address 4 field and QoS control field are omitted compared to the general MAC frame format shown in FIG. 14. In addition, the length of the frame body field of the MAC management frame is reduced to 0 to 2320 octets. Refer to IEEE 802.11 for details of each field.

Figure 18:
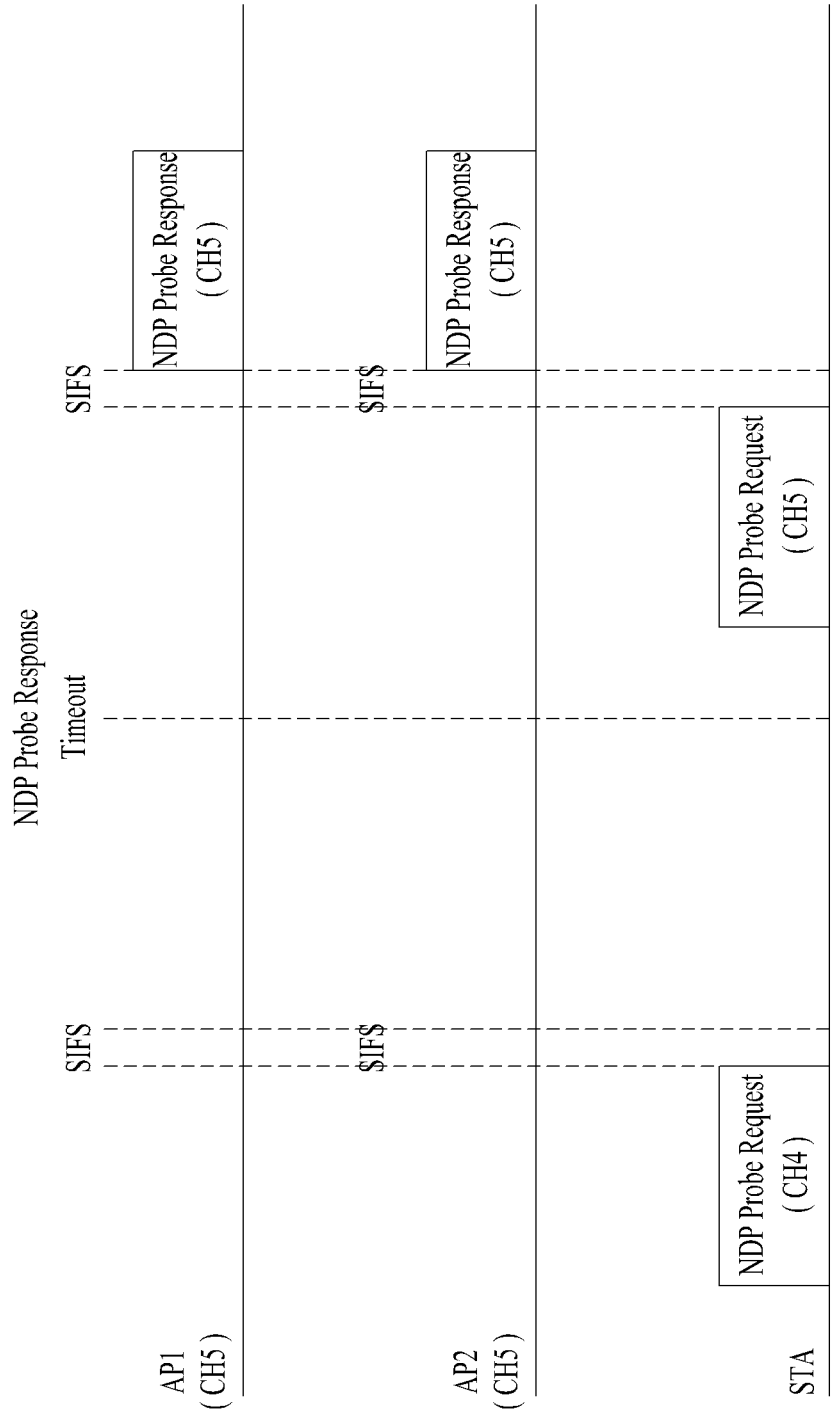
FIG. 18 illustrates an NDP probing procedure in a multi-channel environment.

FIG. 18 illustrates an NDP probing procedure in a multi-channel environment.

In the example of FIG. 18, it is assumed that AP1 and AP2 operate on a first channel (e.g. CH5) and an STA transmits an NDP probe request frame on a second channel (e.g. CH4). When there is no AP operating on CH4, an NDP probe response frame transmitted as a response to the NDP probe request frame is not present.

In this case, a time limit (i.e. NDP probe response timeout) in which the STA waits for the NDP probe response frame upon transmission of the NDP probe request frame is required and the STA may determine that no AP is present on the corresponding channel when the NDP probe request frame is not detected during the timeout. For example, the timeout can be set to a time (e.g. duration of the NDP probe response frame) taken to receive the NDP probe response frame when an AP has normally transmitted the NDP probe response frame. This is exemplary and the timeout in which the STA waits for the NDP probe response frame may be set to a different value.

When the STA that has transmitted the NDP probe request frame on CH4 does not receive the NDP probe response frame until the NDP probe response timeout expires, the STA may determine that no AP is present on CH4 and scanning is not necessary. Accordingly, the STA may move to another channel (e.g. CH5) and transmit the DNP probe request frame thereon.

FIG. 18 shows a case in which AP1 and AP2 transmit probe response frames in response to the NDP probe request frame transmitted from the STA on CH5. In this case, the STA can recognize that at least one AP is present on CH5 by detecting at least one NDP probe response frame on CH5. Then, the STA can perform scanning by transmitting and receiving normal probe request/response frames and thus obtain detailed information on the corresponding network (or AP). Otherwise, the STA may perform passive scanning by listening to a beacon frame on the corresponding channel.

FIG. 19 illustrates an NDP probing procedure according to another embodiment of the present invention.

In the examples of FIGS. 15, 16 and 18, the STA transmits the NDP probe request frame and an AP transmits the NDP probe response frame in response to the NDP probe request frame. In the additional example shown in FIG. 19, the STA transmits the NDP probe request frame and an AP may transmit a normal probe response frame instead of the NDP probe response frame in response to the NDP probe request frame.

Referring to FIG. 19, the STA may transmit the NDP probe request frame and the AP may reply to the NDP probe request frame using a normal probe response frame through an EDCA channel access mechanism upon reception of the NDP probe request frame.

In the example of FIG. 19, the NDP probe request frame may include STF, LTF and SIG field. Sub-fields of the SIG field may include an MCS field, Probe ID field, Time Limit field, Contention Window (CW) field, Minimum Channel Time (MinChannelTime) field, Access Network Option field and CRC field. This configuration of the sub-fields of the SIG field of the NDP probe request frame is exemplary and an additional field may be defined or the sub-fields may be composed of some of the aforementioned exemplary fields.

The MCS field may be used to discriminate a normal PPDU from an NDP probe request. For example, when an MCS value of a certain frame is one of 0 to 10, the MCS value indicates that the frame is a normal PPDU frame. When the MCS value is one of 11 to 15, the MCS value indicates that the frame is an NDP probe request frame.

The probe ID field may be used to designate an AP ID. That is, the probe ID field has a function similar to that of the SSID in the normal probe request frame. However, the probe ID field may include part of an SSID or a compressed form of the SSID rather than a full SSID. When the probe ID field has a value of 0, the probe ID field indicates a wildcard SSID and all APs that have received an NDP probe request frame can reply (that is, transmit NDP probe response frames.). When the probe ID field has a value other than 0, only an AP having the same probe ID value as that included in the NDP probe request frame can reply (that is, transmit an NDP probe response frame). Setting of the probe ID field to part of an SSID (or a compressed SSID) means that one or more APs may be matched to part of the SSID when a full SSID is matched to only one AP. In this case, one or more APs matched to the prove ID value can reply to the NDP probe request frame.

A probe ID may have a value obtained by applying a predetermined hashing function to a full SSID.

For example, a 32-bit CRC calculated value of the full SSID can be used as a probe ID.

32-bit CRC calculation of a calculation field can be performed using a degree-32 standard generator polynomial. This polynomial can be referred to as $G(x)$ where $G(x)=x^{32}+x^{26}+x^{23}+x^{22}+x^{16}+x^{12}+x^{11}+x^{10}+x^8+x^7+x^5+x^4+x^2+x+1$.

When a remainder obtained when $x^k \times (x^{31}+x^{30}+x^{29}+ \ldots +x^2+x+1)$ is divided by $G(x)$ is a (k being the number of bits of the calculation field) and a remainder obtained when a product of the calculation field and $x^{32}$ by $G(x)$ is b, one's complement of the sum of a and b can be defined as the 32-bit CRC calculated value of the calculation field (refer to IEEE 802.11 section 8.2.4.8 for details). For example, a value obtained by applying a desired full SSID to the calculation field and performing 32-bit CRC calculation can be a probe ID (or compressed SSID) value.

Otherwise, 16 least significant bits (LSBs) of a 32-bit CRC calculated value of a full SSID may be used as a probe ID. The 16 LSBs may be represented as 2 least significant bytes or 2 least significant octets. When the probe ID value is set in this manner, the AP can compare the 32-bit CRC calculated value of the full SSID thereof or 16 LSBs of the 32-bit CRC calculated value with the probe ID field value of the NDP probe request frame and reply to the NDP probe request frame using the normal probe response frame when the two values correspond to each other.

The time limit field may be set to a value probe response timeout. That is, the time limit field may correspond to a time limit (or timeout) in which the STA can receive a probe response frame from an AP or APs (or waits to receive the probe response frame) after transmitting the NDP probe request frame. In other words, the STA can detect the corresponding probe response frame (or corresponding AP) only when the AP transmits the normal probe response frame within the time limit. The STA can move to another channel and perform an NDP probing procedure or scanning after expiration of the time limit when the probe response frame is not detected within the time limit.

The CW field may be set to a value indicating a CW for the probe response frame. For example, the CW field can be set to a CW value used when the AP transmits the probe response frame to the STA upon reception of the NDP probe request frame and the AP can transmit the probe response frame through a backoff process according to the CW value. By designating a CW of the AP by the STA, the STA waits for a response from the AP only in a time slot corresponding to the CW and the AP performs a backoff process for probe response frame transmission according to the CW.

The MinChannelTime field refers to a minimum time spent for NDP probing on each channel. For example, the STA can stop NDP probing on a first channel (e.g. channel N) and move to a second channel (e.g. channel N+1) if a physical layer-CCA indication primitive value indicating a busy state is not detected before expiration of MinChannelTime after transmission of the NDP probe request frame on the first channel.

The access network option field designates an access network characteristic of an AP that the STA desires to discover or to receive a response from. Accordingly, only the network (or AP) supporting the corresponding characteristic or service can reply to the NDP probe request frame.

FIG. 20 illustrates an exemplary format of the access network option field.

Access Network Type field indicates whether the network supported through the corresponding AP corresponds to a private network, private network with guest access, chargeable public network, free public network, personal device network, emergency services only network, test or experimental network or wildcard access network type.

Internet field indicates whether the corresponding AP enables Internet access.

Additional Step Required for Access (ASRA) field indicates whether the network requires an additional procedure for network access through the corresponding AP. The additional procedure may include a web authentication process.

Emergency Service Reachable (ESR) field indicates whether the corresponding AP enables emergency service access.

Unauthenticated Emergency Service Accessible (UESA) field indicates whether the corresponding AP enables access of an unauthenticated emergency service.

FIG. 19 shows the format including the probe ID field and the access network option field along with the SIG field of the NDP probe request frame. Considering that the quantity of information that can be included in the SIG field is limited, the format of the SIG field of the NDP probe request frame may be configured as shown in FIG. 21.

FIG. 21 illustrates examples of the format of the SIG field of the NDP probe request frame according to an embodiment of the present invention.

FIG. 21(a) illustrates a case in which the SIG field of the NDP probe request frame includes 36 bits and FIG. 21(b) illustrates a case in which the SIG field includes 48 bits.

In the example of FIG. 21, an SSID/interworking present bit is set to a value that indicates whether the SIG field of the NDP probe request frame includes an SSID (i.e. compressed SSID or a probe ID in the aforementioned examples) or the access network option field. For example, the access network option field is included in the SIG field when the SSID/interworking present bit is set to a first value (e.g. 1) and the compressed SSID field is included in the SIG field when the SSID/interworking present bit is set to a second value (e.g. 0).

FIG. 21(a) shows a case in which a 16-bit compressed SSID is included and FIG. 21(b) shows a case in which a 32-bit compressed SSID is included. The 32-bit compressed SSID shown in FIG. 21(b) may correspond to a 32-bit CRC calculated value of a full SSID. The 16-bit compressed SSID shown in FIG. 21(a) may correspond to 16 least significant bits (or 2 least significant bytes) of the 32-bit CRC calculated value of the full SSID.

Figure 22:
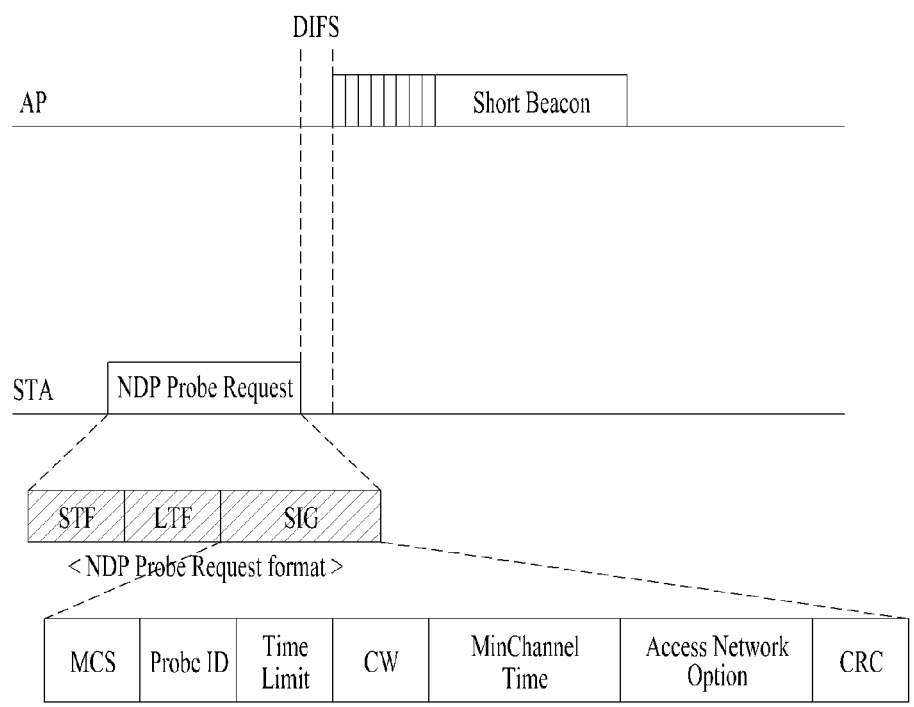
FIG. 22 illustrates an NDP probing procedure according to another embodiment of the present invention.

FIG. 22 illustrates an NDP probing procedure according to another embodiment of the present invention.

FIGS. 15, 16 and 18 illustrate the methods through which the AP transmits the NDP probe response frame in response to the NDP probe request frame transmitted by the STA. FIG. 19 illustrates the method through which the AP transmits the normal probe response frame in response to the NDP probe request frame transmitted by the STA. The additional example of the present invention, shown in FIG. 22, illustrates a method through which the AP transmits a short beacon frame in response to the NDP probe request frame transmitted by the STA.

In the example of FIG. 22, the AP transmits a beacon frame (or short beacon frame) in response to the NDP probe request frame transmitted by the STA. The short beacon frame refers to a beacon frame including only minimum information for AP discovery.

Figure 23:
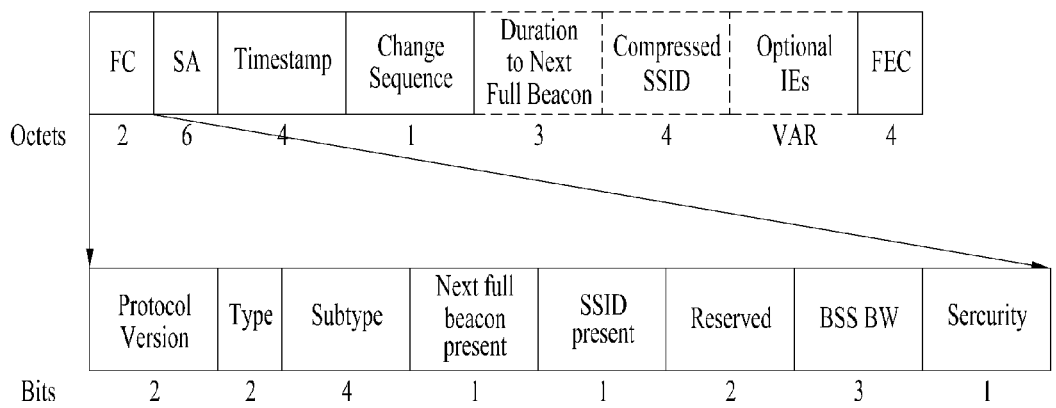
FIG. 23 illustrates exemplary fields included in a short beacon frame.

FIG. 23 illustrates exemplary fields included in the short beacon frame.

Frame Control (FC) field may include protocol version, type, sub-type, next full beacon present, SSID present, BSS BW (bandwidth) and security fields. The FC field may have a length of 2 octets.

From among the sub-fields of the FC field, the protocol version field may be defined as a 2-bit field and may be basically set to 0. The type field and sub-type field may be respectively defined as 2-bit and 4-bit fields and may indicate the function of the corresponding frame together (indicate that the corresponding frame is a short beacon frame, for example). The next full beacon present field may be defined as a 1-bit field and set to a value indicating whether a 'duration to next full beacon' field (or information on the next target beacon transmission time (TBTT)) is included in the short beacon frame. The SSID present field may be defined as a 1-bit field and set to a value indicating whether a compressed SSID field is included in the short beacon frame. The BSS BW field may be defined as a 3-bit field and set to a value indicating a current operation bandwidth (e.g. 1, 2, 4, 8 or 16 MHz). The security field may be defined as a 1-bit field and set to a value indicating whether the corresponding AP is an RSNA AP. Remaining bits (e.g. 2 bits) may be reserved.

Source Address (SA) field included in the short beacon frame may be the MAC address of the AP transmitting the short beacon frame. The SA field may have a length of 6 octets.

A Timestamp field is for synchronization. All STAs that have received the beacon frame can change/update local clock signals thereof according to a timestamp value. The timestamp field of the short beacon frame may include part (e.g. 4 bytes (i.e. 4 octets) of a timestamp of the AP. This is because an (associated) STA that has ever received the total timestamp can perform synchronization using only part of the timestamp even when only part of the total timestamp is provided.

Change Sequence field may include information indicating whether system information is changed. Specifically, when critical information (e.g. full beacon information) of the network is changed, a change sequence counter increases by 1. This field is defined to have a length of 1 octet.

A Duration to Next Full Beacon field may be included in the short beacon frame or may not be included therein. This field can indicate a duration from a short beacon transmission time to a next full beacon transmission time to the STA. Accordingly, the STA that has listened to the short beacon can operate in a doze (or sleep) mode until the next full beacon so as to reduce power consumption. Otherwise, the Duration to Next Full Beacon field may be configured as information indicating the next TBTT. The length of this field may be defined as 3 octets.

A Compressed SSID field may be included in the short beacon frame or may not be included therein. This field may include part of the SSID of the network or a hash (e.g. 32-bit CRC calculated value of the full SSID) of the SSID. The STA that has already known the corresponding network can be permitted to discover the corresponding network using the SSID. The length of this field may be defined as 4 octets, for example.

The short beacon frame may include an additional or optional field or information elements (IEs) in addition to the aforementioned exemplary fields.

A Forward Error Correction (FEC) field may be used to check errors in the short beacon frame and configured as an FCS field. The length of this field may be set to 4 octets.

The STA may determine whether the desired network is available using the SSID (or compressed SSID) included in the short beacon frame. The STA may transmit an association request to the MAC address of the AP, which is included in the short beacon frame transmitted from the desired network. Since a short beacon is transmitted more frequently than a full beacon, in general, the STA can be rapidly associated with the AP by supporting the short beacon. When the STA requires additional information for association, the STA may transmit a probe request to the desired AP.

As described above, the short beacon frame can include minimum information for notifying presence of the AP.

As shown in FIG. 22, upon reception of the NDP probe request frame transmitted from the STA, the AP can reply to the NDP probe request frame using a short beacon frame through the EDCA channel access mechanism.

Time Limit field of the SIG field of the NDP probe request frame indicates short beacon time limit. That is, the Time Limit field may be set to a value with respect to the short beacon frame transmission time limit. The Time Limit field may correspond to a time limit value (or timeout value) in which the STA can receive a short beacon frame (or waits to receive a short beacon frame) from the AP after transmitting the NDP probe request frame. In other words, only when the AP transmits a normal short beacon frame within the time limit, the STA can detect the corresponding short beacon frame (or corresponding AP). When the STA fails to detect the short beacon frame during the time limit, the STA may move to another channel and perform an NDP probing procedure or scanning after expiration of the time limit.

The CW field shown in FIG. 22 may be set to a value indicating a CW for the short beacon frame. For example, the CW field can be set to a CW value used when the AP that has received the NDP probe request frame transmits a short beacon frame to STAs and the AP can transmit the short beacon frame through a backoff process according to the set CW value. By designating the CW of the AP by the STA, the STA waits for the short beacon frame of the AP only during a time slot corresponding to the CW and the AP performs a backoff process for the short beacon frame according to the CW value.

The Access Network Option field shown in FIG. 22 designates access network characteristics of the AP that the STA desires to discover. Accordingly, only the network (or AP) that supports the corresponding characteristics or corresponding service can transmit the short beacon frame in response to the NDP probe request frame. Since the Access Network Option field has the same configuration as that shown in FIG. 20, redundant description is omitted.

The remaining fields (MCS, Probe ID (or compressed SSID), MinChannelTime and CRC) of the NDP probe request frame format shown in FIG. 22 are the same as corresponding fields described in FIG. 19 and thus description thereof is omitted.

In addition, it is possible to apply the SIG field format of the NDP probe request frame shown in FIG. 21 instead of the SIG field format of the NDP probe request frame format shown in FIG. 22.

Figure 24:
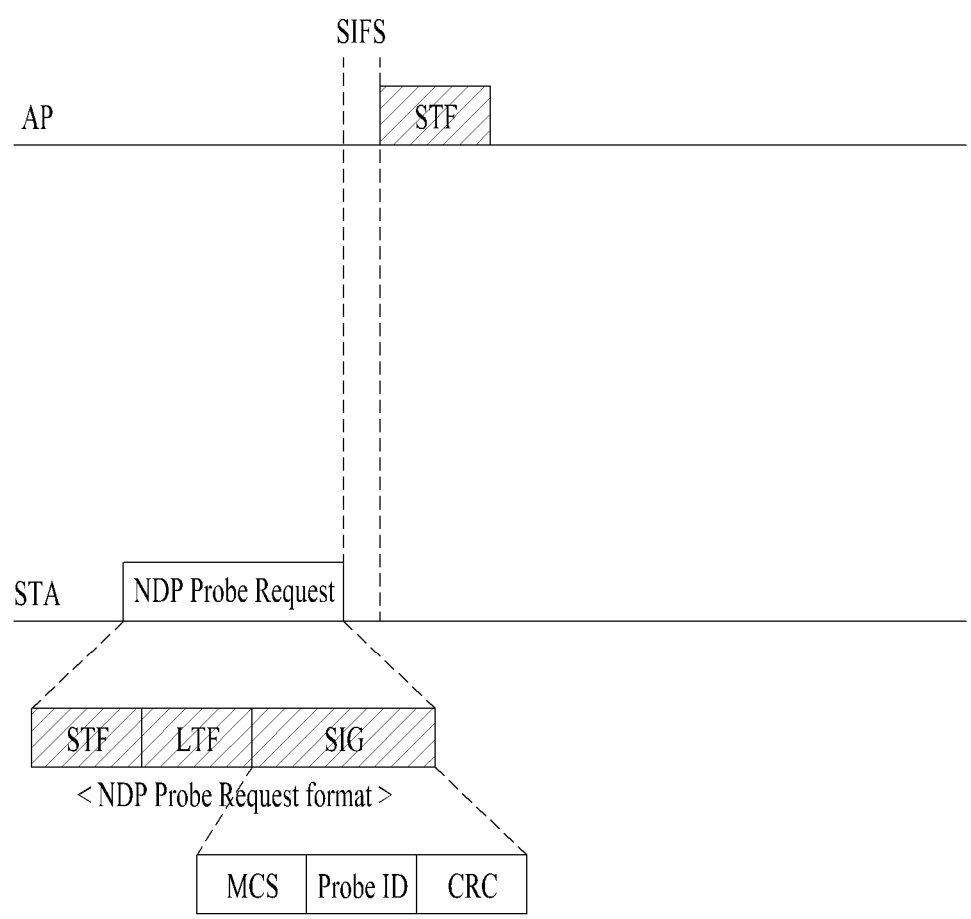
FIG. 24 illustrates an NDP probing procedure according to another embodiment of the present invention.

FIG. 24 illustrates an NDP probing procedure according to another embodiment of the present invention.

FIGS. 15, 16 and 18 illustrate the methods through which the AP transmits the NDP probe response frame in response to the NDP probe request frame transmitted by the STA. FIG. 19 illustrates the method through which the AP transmits the normal probe response frame in response to the NDP probe request frame transmitted by the STA. FIG. 22 illustrates the method through which the AP transmits a short beacon frame in response to the NDP probe request frame transmitted by the STA. The additional example of the present invention, shown in FIG. 24, illustrates a method through which the AP transmits only STF in response to the NDP probe request frame transmitted by the STA.

The STA may transmit the NDP probe request frame and the AP may replay using only STF after lapse of SIFS upon reception of the NDP probe request frame. Here, the AP can reply using one or more STFs.

As shown in FIG. 24, the NDP probe request frame may be composed of STF, LTF and SIG field. Sub-fields of the SIG field may include the MCS field, Probe ID field and CRC field. The MCS field may indicate that the corresponding frame is a normal PPDU frame when MCS field has a value in the range of 0 to 10. MCS field may indicate that the corresponding frame is an NDP probe request frame when the MCS field has a value in the range of 11 to 15. Probe ID field may be used to designate ID of the AP and defined as the aforementioned compressed SSID (e.g. 32-bit CRC calculated value of a full SSID or 16 LSBs thereof). This configuration of the sub-fields of the SIG field of the NDP probe request frame is exemplary and an additional field may be defined or the sub-fields may be composed of some of the aforementioned exemplary fields.

Figure 25:
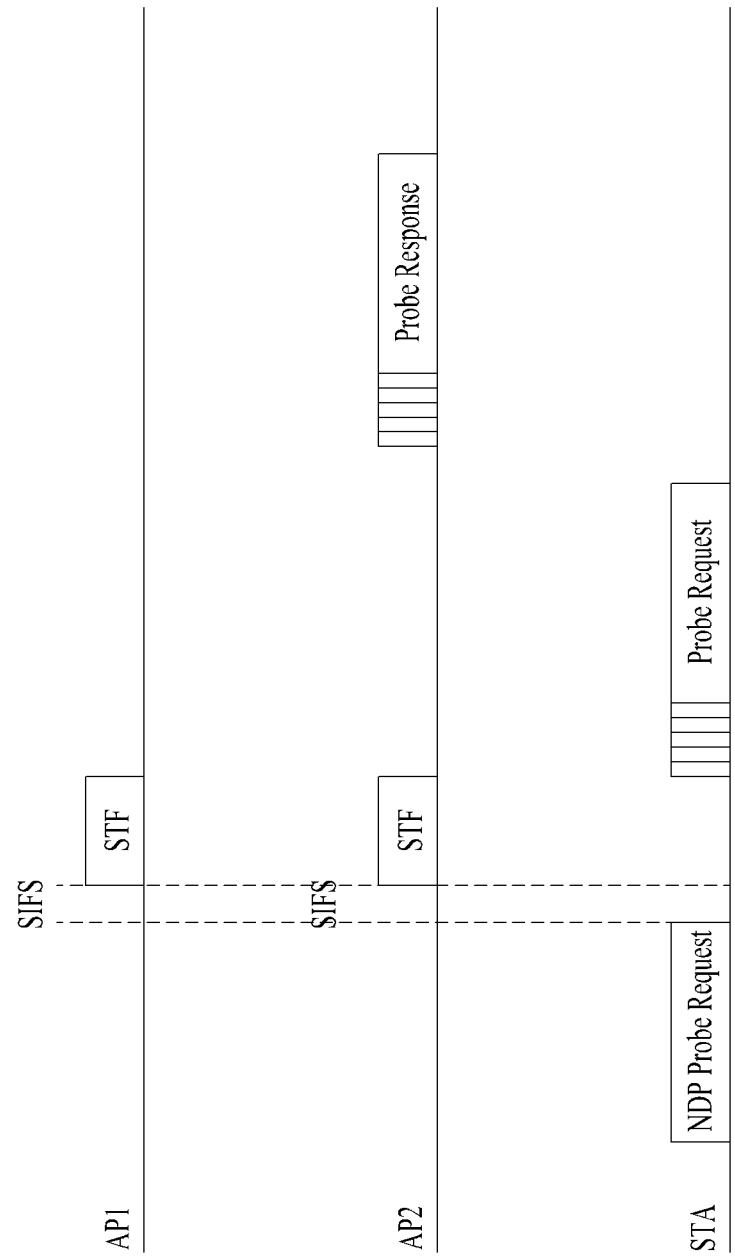
FIG. 25 illustrates another exemplary NDP probing procedure in an environment in which a plurality of APs is present.

FIG. 25 illustrates another example of the NDP probing procedure in an environment in which a plurality of APs is present. In the example of FIG. 25, while NDP probe request frame transmission performed by the STA in an OBSS environment is similar to the example of FIG. 16, the NDP probing procedure shown in FIG. 24 is distinguished from the NDP probing procedure shown in FIG. 16 in that an AP replies using STF instead of the NDP probe response frame.

Referring to FIG. 25, it is assumed that the STA transmits the NDP probe request frame and AP1 and AP2 simultaneously transmit STFs in response to the NDP probe request frame after a lapse of SIFS. That is, it is assumed that a plurality of APs is matched to the value (or compressed SSID) of the probe ID field of the NDP probe request frame transmitted by the STA. Accordingly, AP1 and AP2 can respectively reply to the NDP probe request frame using an STF.

The STA can detect the STF transmitted by at least one of AP1 and AP2. The STA may detect the STF through energy detection (e.g. CCA (Clear Channel Assessment)). When the STA transmits the NDP probe request frame and detects at least one STF in response to the NDP probe request frame, the STA recognizes presence of at least one AP on the corresponding channel. In this case, the STA can perform active scanning by transmitting a normal probe request frame instead of the NDP probe request frame. The normal probe request frame may be transmitted through a predetermined backoff process. Upon reception of the normal probe request frame from the STA, an AP (e.g. AP2) may transmit a normal probe response frame to the STA through a backoff process. The normal probe request frame and the normal probe response frame may be configured in the form of a MAC management frame and transmitted and may have the format as shown in FIG. 17.

Figure 26:
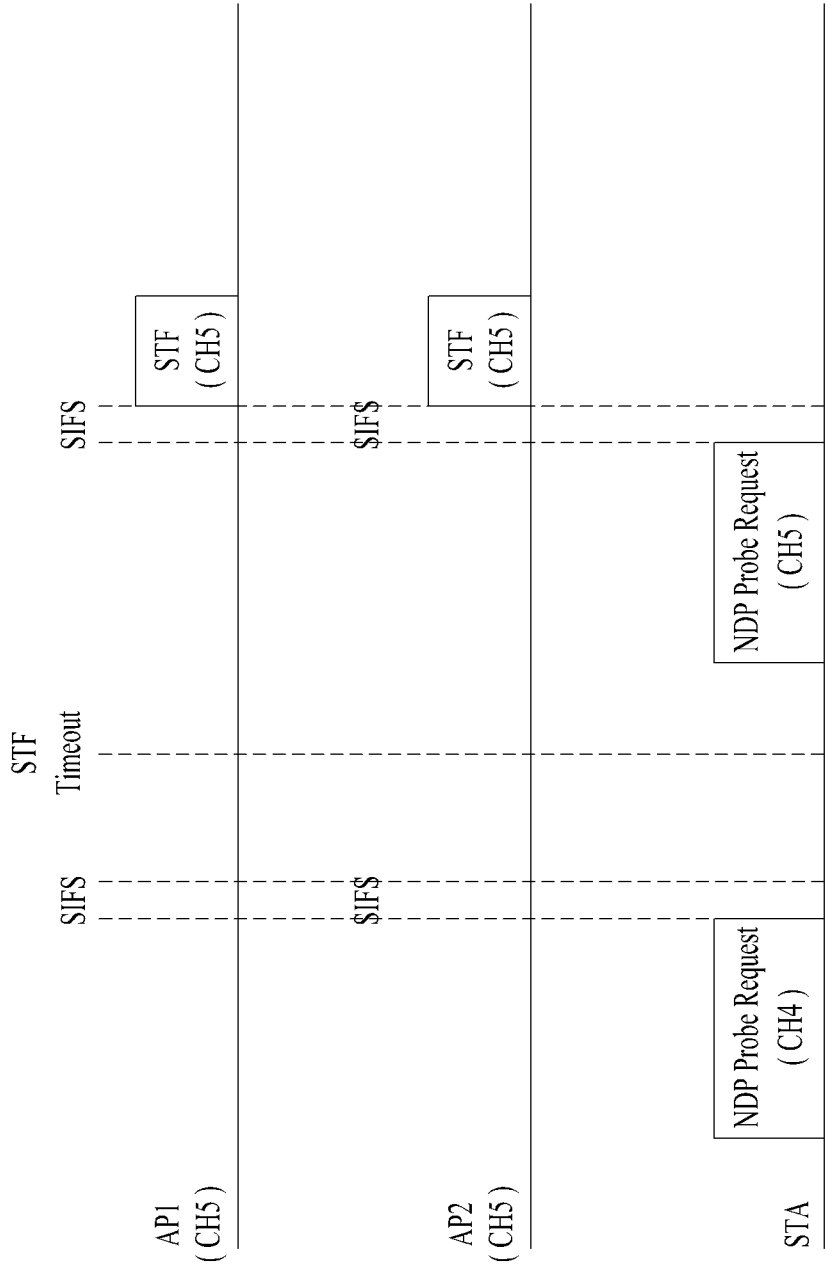
FIG. 26 illustrates another exemplary NDP probing procedure in a multi-channel environment.

FIG. 26 illustrates another example of the NDP probing procedure in a multi-channel environment. While the example of FIG. 26 is similar to the example of FIG. 18 in that AP1 and AP2 operate on the same channel, the example of FIG. 26 is distinguished from the example of FIG. 18 in that the APs transmit SFTs instead of NDP probe response frames in response to the NDP probe request frame of the STA.

In the example of FIG. 26, it is assumed that AP1 and AP2 operate on channel 5 (CH5) and the STA transmits the NDP probe request frame on channel 4 (CH4). Here, if there is no AP operating on CH4, then an NDP probe response frame transmitted in response to the NDP probe request frame is not present.

In this case, the STA requires a time limit (i.e. SFT timeout) in which the STA that has transmitted the NDP probe request frame waits for an NDP probe response frame and may determine that no AP is present on the corresponding channel when the STA has not detected an STF during the time limit. For example, the time limit can be set to a time (a duration of the STF) taken to receive the STF when an AP has normally transmitted the SFT. This is exemplary and the time limit required for the STA to wait for the STF may be set to a different value.

When the STA that has transmitted the NDP probe request frame on CH4 cannot receive the STF before expiration of the NDP probe response timeout, the STA may determine that no AP is present on CH4 and thus scanning is not required. Accordingly, the STA may move to a different channel (e.g. CH5) and transmit the NDP probe request frame.

FIG. 26 shows a case in which AP1 and AP2 transmit STFs in response to the NDP probe request frame transmitted on CH5 by the STA. Accordingly, the STA can recognize presence of at least one AP on the corresponding channel by detecting at least one STF on CH5. Subsequently, the STA can perform scanning by transmitting/receiving a normal probe request frame/normal probe response frame and thus obtain more detailed network (or AP) information. Otherwise, the STA may perform passive scanning by attempting to listen to a beacon frame on the corresponding channel.

Since the NDP probe request frame proposed by the examples of the present invention does not include information on the MAC address of the STA that transmits the NDP probe request frame, an AP or APs replying to the NDP probe request frame may transmit a response frame (i.e. NDP probe response frame, normal probe response frame, (short) beacon frame or SFT) in a broadcast manner.

Figure 27:
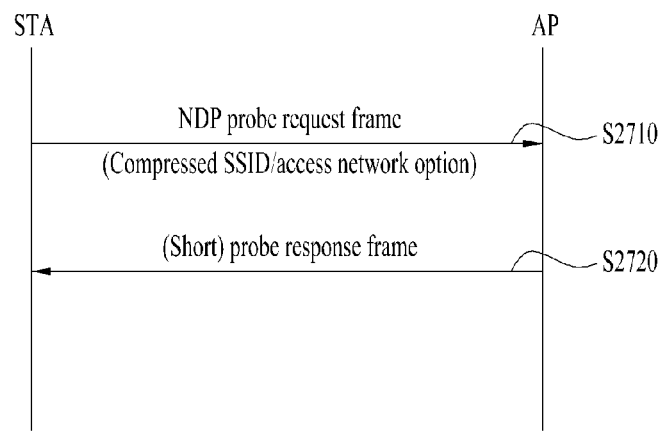
FIG. 27 illustrates a scanning method according to an embodiment of the present invention.

FIG. 27 is a flowchart illustrating a scanning method according to an embodiment of the present invention.

An STA may transmit an NDP probe request frame to an AP in step S2710. The NDP probe request frame may include one of the compressed SSID field or access network option field, as described above, and may further include the SSID/interworking present field that indicates the compressed SSID field or access network option field, which is included therein.

The AP may reply to the NDP probe request frame using a short probe response frame or a normal probe response frame when a compressed SSID calculated on the basis of the SSID thereof corresponds to the value of the compressed SSID field included in the NDP probe request frame or when the access network option of the AP corresponds to information indicated by the access network option field included in the NDP probe request frame in step S2720. The AP may transmit the (short) probe response frame by starting a backoff process after a lapse of DIFS upon reception of the NDP probe request frame and performing contention in step S2720.

When the STA does not receive the (short) probe response frame within a predetermined time (e.g. MinChannelTime), which is not shown, the STA may recognize that no AP is present on the channel on which the NDP probe request frame is transmitted and move to a different channel to perform scanning. Upon reception of the (short) probe response frame, the STA may transmit a normal probe request frame to the AP, transmit an association request frame to the AP or listen to a beacon transmitted from the AP.

A predetermined frame (e.g. SFT as shown in FIGS. 24, 25 and 26) instead of the (short) probe response frame may be transmitted after a lapse of SIFS in step S2720 upon reception of the NDP probe request frame from the STA in step S2710. In this case, the STA may recognize that no AP is present and perform scanning on a different channel when energy is not detected (e.g. STF is not detected) after a lapse of SIFS upon transmission of the NDP probe request frame.

The scanning method described with reference to FIG. 27 may be implemented such that the aforementioned various embodiments of the present invention are independently applied thereto or two or more thereof may be simultaneously applied thereto.

Figure 28:
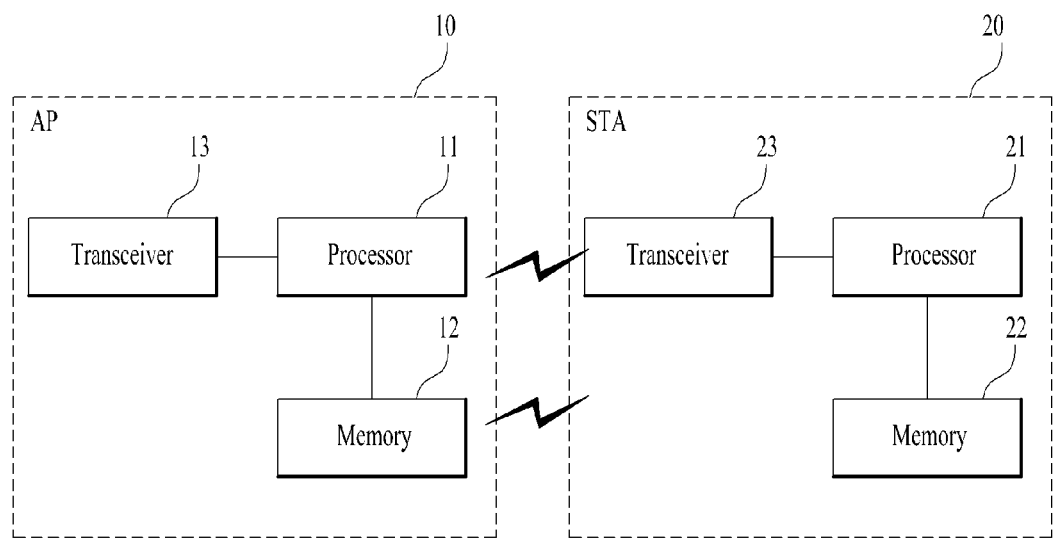
FIG. 28 is a block diagram showing a configuration of a radio apparatus according to an embodiment of the present invention.

FIG. 28 is a block diagram showing a configuration of a radio apparatus according to an embodiment of the present invention.

An AP 10 may include a processor 11, a memory 12 and a transceiver 13. An STA 20 may include a processor 21, a memory 22 and a transceiver 23. The transceivers 13 and 23 may transmit/receive RF signals and implement a physical layer according to IEEE 802. The processors 11 and 21 may be connected to the transceivers 13 and 23 and implement a physical layer and/or a MAC layer according to IEEE 802. The processors 11 and 21 may be configured to perform operations according to the aforementioned various embodiments of the present invention. Modules for implementing operations of the AP and the STA according to the aforementioned various embodiments of the present invention may be stored in the memories 12 and 22 and operated by the processors 11 and 21. The memories 12 and 22 may be internally included in the processors 11 and 21 or installed outside the processors 11 and 21 and connected to the processors 11 and 21 through known means.

Detailed configurations of the AP and the STA may be implemented such that the aforementioned various embodiments of the present invention are independently applied or two or more thereof may be simultaneously applied and descriptions of redundant parts are omitted for clarity.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While various embodiments of the present invention have been described in the context of IEEE 802.11, the present invention is also applicable to many other mobile communication systems.

The invention claimed is:

1. A method for performing scanning by a station (STA) in a wireless communication system, the method comprising:

transmitting a null data packet (NDP) probe request frame on a first channel,
wherein the NDP probe request frame includes an STF (Short Training Field), LTF (Long Training Field) and SIG (Signal) field without a data field, and
wherein the SIG field includes a compressed service set ID (SSID) field, and
wherein the compressed SSID field is set to a 32-bit cyclic redundancy check (CRC) calculated value when the compressed SSID field is defined as a 32-bit field and set to 16 least significant bits (LSBs) of a 32-bit CRC calculated value of the SSID when the compressed SSID field is defined as a 16-bit field; and
performing the scanning on the first channel, when a probe response frame in response to the NDP probe request frame is received from an access point (AP) on the first channel.

2. The method according to claim 1, wherein the STA transmits a normal probe request frame to the AP, sends an association request frame to the AP or listens to a beacon frame from the AP upon reception of the probe response frame from the AP.

3. The method according to claim 1, wherein the probe response frame is transmitted from the AP, when the AP receives the NDP probe request frame and a value of the compressed SSID field included in the NDP probe request frame is identical to a value of a compressed SSID generated on the basis of an SSID of the AP.

4. The method according to claim 1, wherein the NDP probe request frame includes at least one of the compressed SSID field and an access network option field,
wherein the NDP probe request frame further includes a 1-bit SSID/interworking present field,
wherein the SSID/interworking present field indicates which one of the compressed SSID field and the access network option field is included in the NDP probe request frame.

5. The method according to claim 4, wherein the probe response frame is transmitted from the AP when the AP receives the NDP probe request frame and a value of the access network option field included in the NDP probe request frame is identical to an access network option of the AP.

6. The method according to claim 4, wherein the access network option field has a size of 8 bits and includes a 4-bit access network type field, a 1-bit Internet field, a 1-bit additional step required for access (ASRA) field, a 1-bit emergency service reachable (ESR) field and a 1-bit unauthenticated emergency service accessible (UESA) field.

7. The method according to claim 5, wherein one of the SSID/interworking present field, the compressed SSID field and the access network option field is included in the SIG field of the NDP probe request frame.

8. The method according to claim 1, wherein the probe response frame is a normal probe response frame or a short probe response frame.

9. The method according to claim 1, wherein the probe response frame is broadcast.

10. The method according to claim 1, wherein the AP transmits the probe response frame through a backoff process after a lapse of Distributed Coordination Function (DCF) Inter-Frame Space (DIFS) upon reception of the NDP probe request frame.

11. The method according to claim 1, wherein the STA recognizes that the AP is present on the first channel when a frame is detected on the first channel after lapse of SIFS (Short Inter-Frame Space) upon transmission of the NDP probe request frame on the first channel, and the STA moves to a second channel and performs scanning when a frame is not detected on the first channel for a predetermined time.

12. The method according to claim 1, wherein the STA moves to the second channel and performs scanning when a physical layer-CCA.indication primitive value indicating a busy state is not detected before expiration of minimum channel time after transmission of the NDP probe request frame on the first channel.

13. A station (STA) capable of performing scanning in a wireless communication system, the station comprising:

a transceiver; and
a processor,
wherein the processor transmits an NDP probe request frame on a first channel using the transceiver, and performs the scanning on the first channel when a probe response frame in response to the NDP probe request frame is received on the first channel by the transceiver from an access point (AP),
wherein the NDP probe request frame includes an STF (Short Training Field), LTF (Long Training Field) and SIG (Signal) field without a data field, and the SIG field includes a compressed SSID field, and
wherein the compressed SSID field is set to a 32-bit cyclic redundancy check (CRC) calculated value when the compressed SSID field is defined as a 32-bit field and set to 16 least significant bits (LSBs) of a 32-bit CRC calculated value of the SSID when the compressed SSID field is defined as a 16-bit field.

* * * * *